US011076169B2

(12) United States Patent
Rusanovskyy et al.

(10) Patent No.: US 11,076,169 B2
(45) Date of Patent: Jul. 27, 2021

(54) SWITCHABLE INTERPOLATION FILTERING (SIF) FOR VIDEO CODING

(71) Applicant: QUALCOMM Incorporated, San Diego, CA (US)

(72) Inventors: Dmytro Rusanovskyy, San Diego, CA (US); Kevin Pascal Andre Reuze, Voisins le Bretonneux (FR); Vadim Seregin, San Diego, CA (US); Wei-Jung Chien, San Diego, CA (US); Marta Karczewicz, San Diego, CA (US); Yan Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/930,790

(22) Filed: May 13, 2020

(65) Prior Publication Data

US 2020/0366924 A1  Nov. 19, 2020

Related U.S. Application Data

(60) Provisional application No. 62/847,849, filed on May 14, 2019.

(51) Int. Cl.
*H04N 19/52* (2014.01)
*H04N 19/117* (2014.01)
(Continued)

(52) U.S. Cl.
CPC .......... *H04N 19/52* (2014.11); *H04N 19/117* (2014.11); *H04N 19/176* (2014.11); *H04N 19/577* (2014.11)

(58) Field of Classification Search
None
See application file for complete search history.

(56) References Cited

U.S. PATENT DOCUMENTS 10,341,659 B2     7/2019  Lee et al.
2018/0098066 A1*  4/2018  Lee ..................... H04N 19/176

FOREIGN PATENT DOCUMENTS

WO      2018067848 A1     4/2018

OTHER PUBLICATIONS

Bordes (Interdigital) P., et al., "Non-CE4: Unification of merge Interpolation filter (triangle and pairwide-average)," 16. JVET Meeting, Oct. 1, 2019-Oct. 11, 2019; Geneva, CH (The Joint Video Exploration Team of ISO/IEC JTC1/SC29/WG11 and ITU-T SG.16), No. JVET-P0340, Oct. 4, 2019 (Oct. 4, 2019), XP030216994, 3 pages, Retrieved from the Internet: URL: http://phenix.int-evry.fr/jvet/doc_end_user/documents/16_Geneva/wg11/JVET-P0340-v2.zip JVET-P0340 - switchingInterpolationFilter-merge-v2.docx [retrieved on Oct. 4, 2019] sections 1 and 2.

(Continued)

*Primary Examiner* — Christopher Braniff
(74) *Attorney, Agent, or Firm* — Shumaker & Sieffert, P.A.

(57) ABSTRACT

A device for coding video data may determine whether a switchable interpolation filter (SIF) index value of a first motion vector (MV) component of a pairwise average motion vector predictor (MVP) is equal to a SIF index value of a second MV component of the pairwise average MVP. Based on the SIF index value of the first MV component being equal to the SIF index value of the second MV component, the device may set the SIF index of the pairwise average MVP to be equal to the SIF index of the first MV component. The device may code the video data based on the SIF index value of the pairwise average MVP.

19 Claims, 21 Drawing Sheets

(51) Int. Cl.
*H04N 19/577* (2014.01)
*H04N 19/176* (2014.01)

(56) References Cited

OTHER PUBLICATIONS

Henkel (Fraunhofer) A., et al., "CE4: Switchable Interpolation Filter (CE4-1.1, CE4-1.2, CE4-1.3, CE4-1.4, CE4-1.5, CE4-1.6, CE4-1. 7)," 15. JVET Meeting; Jul. 3, 2019-Jul. 12, 2019; Gothenburg, SE (The Joint Video Exploration Team of ISO/IEC JTC1/SC29/WG11 and ITU-T SG.16 ), No. JVET-O0057, Jul. 9, 2019 (Jul. 9, 2019), XP030218557, 10 pages, Retrieved from the Internet: URL: http://phenix.int-evry.fr/jvet/doc_end_user/documents/15_Gothenburg/wg11/JVET-O0057-v2.zip - JVET-O0057-v2/JVET-O0057_v2. docx [retrieved on Jul. 9, 2019].
International Search Report and Written Opinion—PCT/US2020/032898—ISA/EPO—dated Aug. 27, 2020 (192869WO), 18 pages.
Yang (Huawei) H., et al., "Description of Core Experiment 4 (CE4): Inter Prediction," 14. JVET Meeting, Mar. 19, 2019-Mar. 27, 2019; Geneva, CH (The Joint Video Exploration Team of ISO/IEC JTC1/SC29/WG11 and ITU-T SG.16), No. JVET-N1024, Apr. 19, 2019 (Apr. 19, 2019), XP030257024, 11 pages, Retrieved from the Internet: URL: http://phenix.int-evry.fr/jvet/doc_end_user/documents/14_Geneva/wg11/JVET-N1024-v3.zip JVET-N1024-v3.docx [retrieved on Apr. 19, 2019] section 1 "CE4-1:Switchable interpolation filter".
Y-L Hsiao., et al., "CE4.2.8: Merge mode enhancement," 11. JVET Meeting, Jul. 10, 2018-Jul. 18, 2018, Ljubljana, SI (The Joint Video Exploration Team of ISO/IEC JTC1/SC29/WG11 and ITU-T SG. 16 ), No. JVET-K0245, Jul. 10, 2018 (Jul. 10, 2018), XP030249004, 6 pages, Retrieved from the Internet: URL: http://phenix.int-evry.fr/jvet/doc_end_user/documents/11_Ljubljana/wg11/JVET-K0245-v2.zip JVET-K0245-v1.docx [retrieved on Jul. 10, 2018] abstract sections 2.3 and 3.
Bossen F., et al., "JEM Software Manual," Joint Collaborative Team on Video Coding (JCT-VC) of ITU-T SG16 WP3 and ISO/IEC JTC1/SC29/WG11, Document: JCTVC-Software Manual, Retrieved on Aug. 3, 2016, pp. 1-29.
Bross B., et al., "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, Document: JCTVC-L1003_v34, 12th Meeting: Geneva, CH, Jan. 14-23, 2013, 310 pages.

Bross B., et al., "Versatile Video Coding (Draft 5)", Joint Video Experts Team (JVET) of ITU-T SG 16 WP 3 and ISO/IEC JTC 1/SC 29/WG 11, 14th Meeting: Geneva, CH, Mar. 19-27, 2019, JVET-N1001-v3, 371 pages.
Bross B., et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q2001-vE, 515 Pages.
Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16 ); URL: http://phenix.int-evry.fr/jvet/ ,, No. JVET-A1001 Feb. 24, 2016 (Feb. 24, 2016), XP030150000, 27 pages.
Henkel A., et al, "Non-CE4: Switched half-pel Interpolation Filter", Joint Video Experts Team (JVET) of ITU-T SG 16 WP 3 and ISO/IEC JTC 1/SC 29/WG 11, 14th Meeting: Geneva, CH, Mar. 19-27, 2019, Document: JVET-N0309-v3, pp. 1-8.
ITU-T H.264, Series H: Audiovisual and Multimedia Systems, Infrastructure of audiovisual services—Coding of moving video, Advanced video coding for generic audiovisual services, Mar. 31, 2010, pp. 674, URL:https://www.itu.int/rec/dologin_pub.asp?lang=e&id=T-RECH.264-201003-S!!PDF-E&type=items.
ITU-T H.265, "Series H: Audiovisual and Multimedia Systems, Infrastructure of Audiovisual Services—Coding of Moving Video, High efficiency Video Coding," The International Telecommunication Union. Dec. 2016, 664 Pages.
Lu T., et al., "CE12-related: Universal Low Complexity Reshaper for SDR and HDR video", Joint Video Experts Team (JVET) of ITU-T SG 16 WP 3 and ISO/IEC JTC 1/SC 29/WG 11, JVET-L0247, 12th Meeting: Macao, CN, Oct. 3-12, 2018, pp. 1-10.
Su Y., et al, "CE4-related: Generalized Bi-prediction Improvements Combined from JVET-L0197 and JVET-L0296", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0646-v5, pp. 1-6.
Su Y., et al, "CE4-Related: Generalized bi-prediction Improvements", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0197-v4, pp. 1-3.
Zhao X., et al, "CE6: Fast DST-7/DCT-8 with Dual Implementation Support (Test 6.1.4)", Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0286, pp. 1-11.

\* cited by examiner

| $A_{-1,-1}$ | | | | $A_{0,-1}$ | | | | $A_{1,-1}$ | | | $A_{2,-1}$ |
|---|---|---|---|---|---|---|---|---|---|---|---|
| | | | | | | | | | | | |
| | | | | | | | | | | | |
| | | | | | | | | | | | |
| $A_{-1,0}$ | | | | $A_{0,0}$ | $a_{0,0}$ | $b_{0,0}$ | $c_{0,0}$ | $A_{1,0}$ | | | $A_{2,0}$ |
| $d_{-1,0}$ | | | | $d_{0,0}$ | $e_{0,0}$ | $f_{0,0}$ | $g_{0,0}$ | $d_{1,0}$ | | | $d_{2,0}$ |
| $h_{-1,0}$ | | | | $h_{0,0}$ | $i_{0,0}$ | $j_{0,0}$ | $k_{0,0}$ | $h_{1,0}$ | | | $h_{2,0}$ |
| $n_{-1,0}$ | | | | $n_{0,0}$ | $p_{0,0}$ | $q_{0,0}$ | $r_{0,0}$ | $n_{1,0}$ | | | $n_{2,0}$ |
| $A_{-1,1}$ | | | | $A_{0,1}$ | $a_{0,1}$ | $b_{0,1}$ | $c_{0,1}$ | $A_{1,1}$ | | | $A_{2,1}$ |
| | | | | | | | | | | | |
| | | | | | | | | | | | |
| | | | | | | | | | | | |
| $A_{-1,2}$ | | | | $A_{0,2}$ | $a_{0,2}$ | $b_{0,2}$ | $c_{0,2}$ | $A_{1,2}$ | | | $A_{2,2}$ |

FIG. 3

SWITCHABLE INTERPOLATION FILTERING (SIF) FOR VIDEO CODING

This application claims the benefit of U.S. Provisional Patent Application No. 62/847,849 filed May 14, 2019, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for video coding such as improving performance of inter-prediction by harmonization of switchable interpolation filtering (SIF) with other components of the video coding design. The example techniques may be used in existing video coding techniques such as the High Efficiency Video Coding (HEVC) standard or the Versatile Video Coding (VVC) standard, currently under development, as a few examples, or future coding standards. The example techniques may be used in non-standard video coding as well.

In one example, a method of coding video data includes determining whether a switchable interpolation filter (SIF) index value of a first motion vector (MV) component of a pairwise average motion vector predictor (MVP) is equal to a SIF index value of a second MV component of the pairwise average MVP, based on the SIF index value of the first MV component being equal to the SIF index value of the second MV component, setting a SIF index of the pairwise average MVP to be equal to the SIF index of the first MV component, and coding the video data based on the SIF index value of the pairwise average MVP.

In another example, a device for coding video data includes a memory for storing the video data and one or more processors implemented in circuitry and communicatively coupled to the memory, the one or more processors being configured to: determine whether a SIF index value of a first MV component of a pairwise average MVP is equal to a SIF index value of a second MV component of the pairwise average MVP; based on the SIF index value of the first MV component being equal to the SIF index value of the second MV component, set a SIF index of the pairwise average MVP to be equal to the SIF index of the first MV component; and code the video data based on the SIF index value of the pairwise average MVP.

In another example, a non-transitory computer-readable storage medium stores instructions that, when executed, cause one or more processors to determine whether a SIF index value of a first MV component of a pairwise average MVP is equal to a SIF index value of a second MV component of the pairwise average MVP, based on the SIF index value of the first MV component being equal to the SIF index value of the second MV component, set a SIF index of the pairwise average MVP to be equal to the SIF index of the first MV component, and code the video data based on the SIF index value of the pairwise average MVP.

In another example, a device for coding video data includes means for determining whether a SIF index value of a first MV component of a pairwise average MVP is equal to a SIF index value of a second MV component of the pairwise average MVP, means for, based on the SIF index value of the first MV component being equal to the SIF index value of the second MV component, setting a SIF index of the pairwise average MVP to be equal to the SIF index of the first MV component, and means for coding the video data based on the SIF index value of the pairwise average MVP.

In another example, a method for coding video data includes determining a switchable interpolation filter (SIF) parameter for a merge list candidate of the video data, performing a merge process, storing the SIF parameter for a motion vector (MV) resulting from the merge process regardless of the SIF parameter being validated for the MV, and coding the video data based on the MV.

In another example, a device for coding video data includes a memory for storing the video data and one or more processors implemented in circuitry and communicatively coupled to the memory, the one or more processors being configured to: determine a switchable interpolation filter (SIF) parameter for a merge list candidate of the video data, perform a merge process, store the SIF parameter for a motion vector (MV) resulting from the merge process regardless of the SIF parameter being validated for the MV, and code the video data based on the MV.

In another example, a non-transitory computer-readable storage medium stores instructions that, when executed, cause one or more processors to determine a switchable interpolation filter (SIF) parameter for a merge list candidate of the video data, perform a merge process, store the SIF parameter for a motion vector (MV) resulting from the merge process regardless of the SIF parameter being validated for the MV, and code the video data based on the MV.

The details of one or more examples are set forth in the accompanying drawings and the description below. Other features, objects, and advantages will be apparent from the description, drawings, and claims.

BRIEF DESCRIPTION OF DRAWINGS

FIG. 3 is a conceptual diagram illustrating an example of integer samples and fractional sample positions for quarter sample luma interpolation.

DETAILED DESCRIPTION

Switchable interpolation filtering (SIF) is a technique in video coding that may improve coding efficiency. However, in some proposed implementations, signaling of syntax elements is combined with other signaling, such as adaptive motion vector resolution (AMVR) signaling, and these implementations do not allow separate use of SIF and AMVR. The lack of separation between SIF and AMVR may cause technical problems when a separate usage of these coding tools may be preferable. For example, a video coder (e.g., video encoder or video decoder) may not be able to signal or parse information that separately indicates information for SIF and AMVR, even in instances where such signaling and parsing may be beneficial. This may result in poorer operation of the video coder (e.g., coding techniques that would result in better compression or video quality may be unavailable because of lack of separation between SIF and AMVR). Additionally, with such implementations, SIF signaling does not utilize certain dependencies which may be present in different coding modes available in the draft Versatile Video Coding (VVC). Furthermore, in the case of merge mode, the SIF filter index inheritance is limited to the motion vector predictor (MVP) candidates from spatial neighbors. These limitations and drawbacks may lead to less efficient coding and a higher use of bandwidth.

This disclosure describes example techniques that may overcome the technical problems described above and provide a technical solution with a practical application that may improve techniques of video coding. For example, this disclosure describes several techniques that may improve compression efficiency of SIF by harmonization and/or joint optimization of the SIF signaling and inheritance mechanism with other video coding tools.

Figure 1:
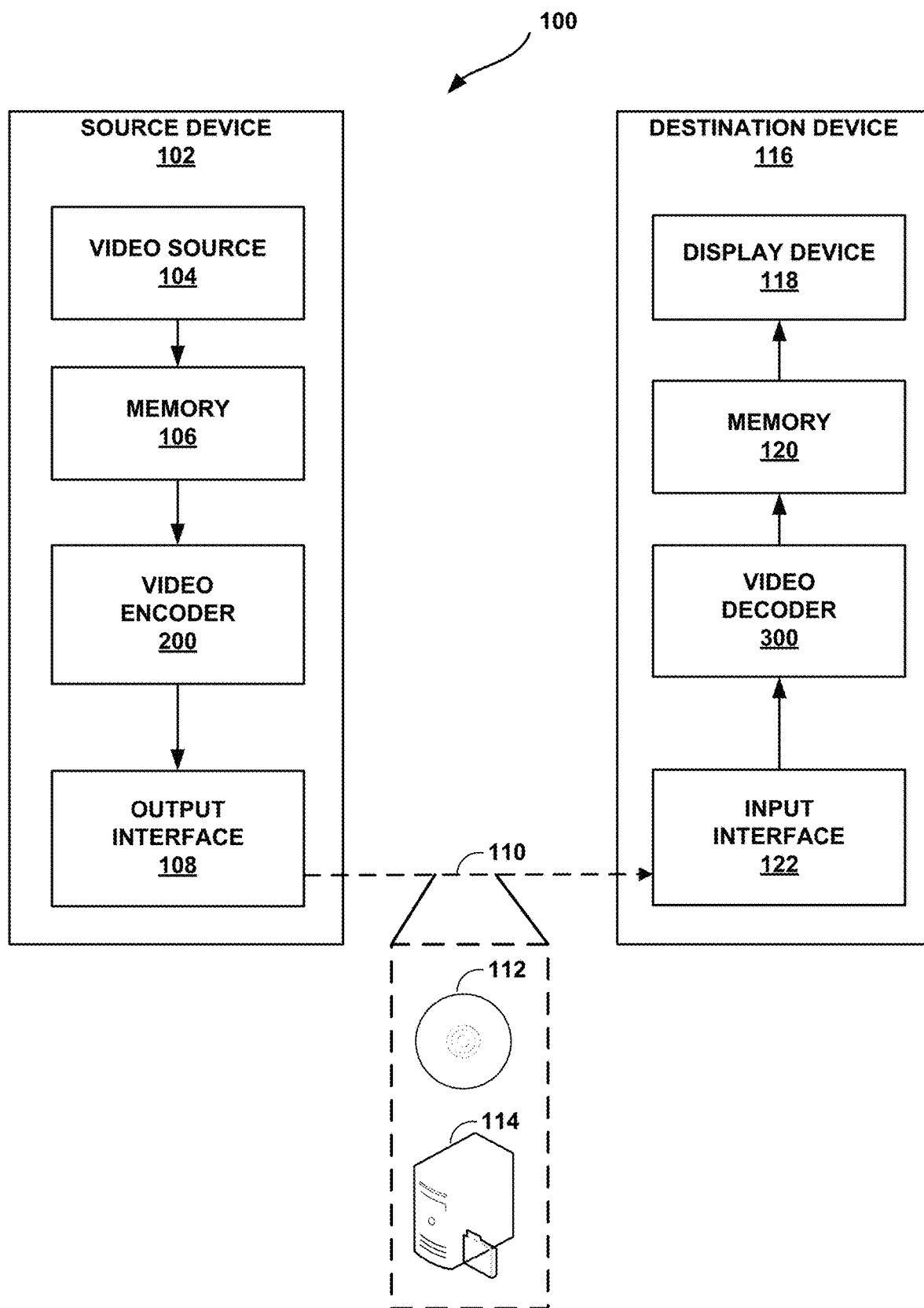
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for switchable interpolation filtering (SIF) for video coding disclosed herein. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for SIF. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memory 106 and memory 120 may store raw video data, e.g., raw video from video source 104 and raw, decoded video data from video decoder 300. Additionally or alternatively, memory 106 and memory 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memory 106 and memory 120 may store encoded video data, e.g., output from video encoder 200 and input to video decoder 300. In some examples, portions of memory 106 and/or memory 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such ITU-T H.266, also referred to as Versatile Video Coding (VVC). A draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 March 2019, JVET-N1001-v3 (hereinafter "VVC Draft 5"). The most recent draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-vE (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC or a future video coding standard. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

In accordance with the techniques of this disclosure, video encoder 200 and video decoder 300 may be configured to perform switchable interpolating filtering (SIF) using the example techniques described in this disclosure. As one example, the SIF parameters (e.g., an index used to determine interpolation filter coefficients) used for performing SIF need not be signaled (e.g., outputted by video encoder 200 and received by video decoder 300) based on conditions of adaptive motion vector resolution (AMVR). For example, some techniques described below limited when SIF parameters are signaled (e.g., outputted by video encoder 200 and received by video decoder 300) based on resolution of motion vector difference used in AMVR. In accordance with one or more examples described in this disclosure, the SIF parameters may not be limited to be signaled (e.g., outputted or received) based on the resolution of the motion vector difference used in AMVR. In this way, the example techniques allow for utilization of SIF regardless of resolution of motion vector difference used in AMVR, which may in turn result in video encoder 200 and video decoder 300 performing better video compression.

Moreover, in some examples, video encoder 200 and video decoder 300 may utilize signaling mechanism for signaling SIF parameters that exploits certain dependencies present in different coding modes available in VVC. Video encoder 200 and video decoder 300 may not be limited to inherit SIF parameters only from motion vector predictor candidates from spatial neighboring blocks.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

The following is some additional information for video coding and restates or builds on the above description. For example, the following provides more information for motion vector prediction related techniques.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. The latest joint draft of MVC is described in "Advanced video coding for generic audiovisual services," ITU-T Recommendation H.264, March 2010.

Another video coding standard is High Efficiency Video Coding (HEVC), developed by the Joint Collaboration Team on Video Coding (JCT-VC) of ITU-T Video Coding Experts Group (VCEG) and ISO/IEC Motion Picture Experts Group (MPEG). As described above, VVC is currently under development as well.

The following describes examples of inter-picture prediction techniques. Examples of Inter-picture prediction include: 1) Block motion copy with spatial, temporal, history-based, and pairwise average merging candidates, 2) Affine motion inter prediction, 3) sub-block based temporal motion vector prediction, 4) AMVR, 5) 8x8 block based motion compression for temporal motion prediction, 6) High precision (1/16 pel) motion vector storage and motion compensation with 8-tap interpolation filter for luma component and 4-tap interpolation filter for chroma component, 7) Triangular partitions, 8) Combined intra and inter prediction, 9) Merge with motion vector difference (MMVD), 10) Symmetrical motion vector difference (MVD) coding, 11) Bi-directional optical flow, 12) Decoder side motion vector refinement, and 13) Bi-predictive weighted averaging.

For each inter-predicted CU, motion parameters including motion vectors, reference picture indices and a reference picture list usage index, and additional information are used with the new coding features of VVC for inter-predicted sample generation. The motion parameters may be signaled in an explicit or implicit manner. For example, video encoder 200 may signal the motion parameters in a bitstream and video decoder 300 may determine the motion parameters by reading (e.g., parsing) the motion parameters in the bitstream. In another example, video encoder 200 may not signal the motion parameters in the bitstream and video decoder 300 may infer (e.g., determine) the motion parameters. For example, when a CU is coded with skip mode, the CU is associated with one PU and has no significant residual coefficients, no coded motion vector delta or no reference picture index. A merge mode is specified whereby the motion parameters for the current CU are obtained from neighboring CUs, including spatial and temporal candidates, and additional schedules introduced in VVC. The merge mode may be applied to any inter-predicted CU, not only for skip mode. The alternative to merge mode is the explicit transmission of motion parameters, where a motion vector, a corresponding reference picture index for each reference picture list and a reference picture list usage flag and other information are signaled explicitly per each CU.

Beyond the inter coding features in HEVC, the VTM4 (VVC test model 4) includes a number of new and refined inter prediction coding tools listed as follows: 1) Extended merge prediction, 2) MMVD, 3) AMVP mode with symmetric MVD signaling, 4) Affine motion compensated prediction, 5) Subblock-based temporal motion vector prediction (SbTMVP), 6) AMVR, 7) Motion field storage: $1/16^{th}$ luma sample MV storage and 8×8 motion field compression, 8) Bi-prediction with weighted averaging (BWA), 9) Bi-directional optical flow (BDOF), 10) Decoder side motion vector refinement (DMVR), 11) Triangle partition prediction, and 12) Combined inter and intra prediction (CIIP).

The following provides details on the inter prediction techniques specified in VVC, starting with sub-pixel interpolation filtering. Video compression technologies perform spatial and temporal prediction to reduce or remove the redundancy inherent in input video signals. In order to reduce temporal redundancy (that is, similarities between video signals in neighboring frames), motion estimation is carried out to track the movement of video objects. Motion estimation may be done on blocks of variable sizes. The object displacement as the outcome of motion estimation is commonly known as motion vectors. Motion vectors may have half-, quarter-pixel, $1/16^{th}$-pixel precisions (or any finer precisions). This allows the video coder (e.g., video encoder 200 and video decoder 300) to track a motion field in higher precision than integer-pixel locations and hence obtain a better prediction block. When motion vectors with fractional pixel values are used, interpolation operations are carried out.

Figure 2:
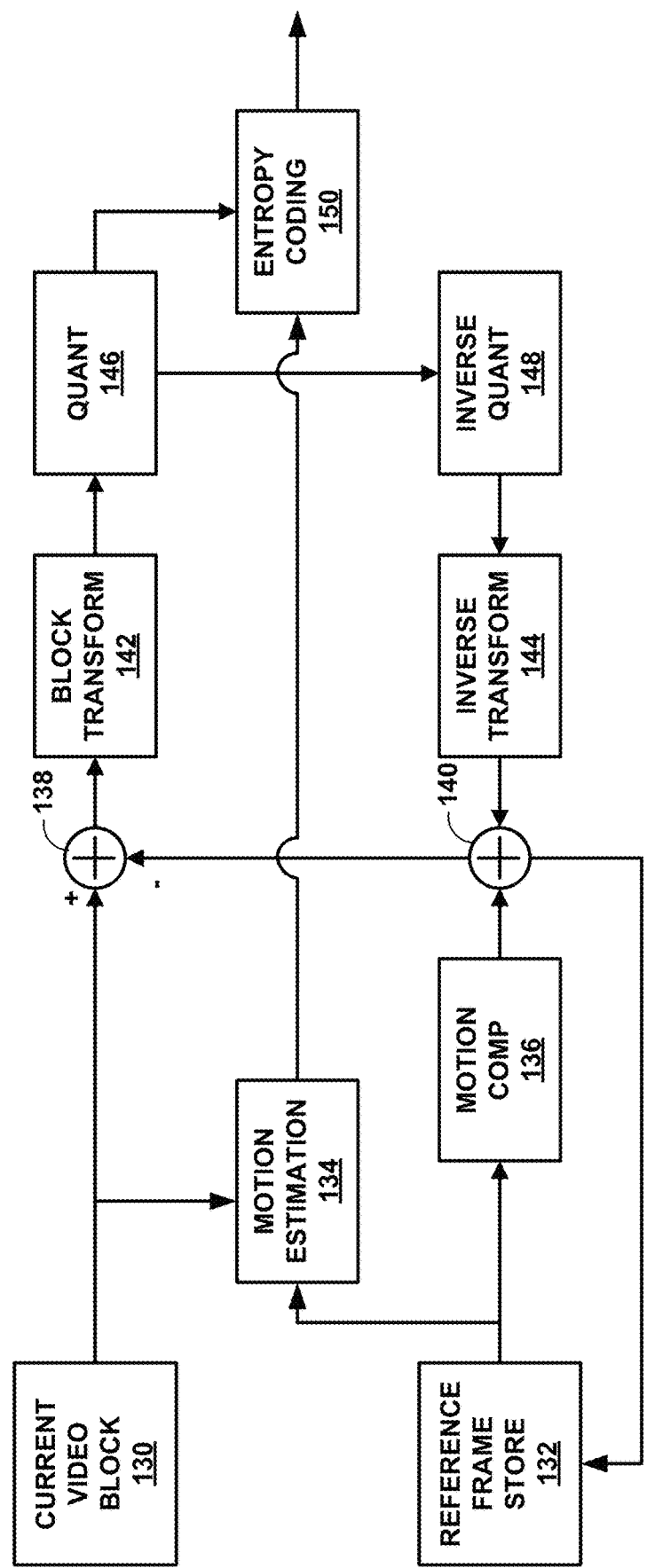
FIG. 2 is a block diagram illustrating an example video encoder that may perform the techniques of this disclosure.

After motion estimation, the best motion vector may be decided (by e.g., video encoder 200 or video decoder 300) using a certain rate-distortion model. Then, the prediction video block may be formed through motion compensation using the best motion vector. The residual video block is formed by subtracting the prediction video block from the original video block. A transform is then applied on the residual block. The transform coefficients are then quantized and may be entropy coded to further reduce bit rate. FIG. 2 is a block diagram of an example video encoder that may perform the techniques of this disclosure, including using block-based motion estimation to reduce temporal redundancy. In some examples, video encoder 200 of FIG. 1 may perform the techniques of the video encoder of FIG. 2. Some video coding systems, such as the H.264/AVC or HEVC standard, also allow spatial prediction for intra coded blocks, which is not depicted in FIG. 2.

In the example of FIG. 2, a current video block 130 is provided to motion estimation unit 134 and residual generation unit 138. Residual generation unit 138 may generate a residual block by subtracting a prediction block from the current block. Block transform unit 142 may perform a transform operation on the residual block to generate transform coefficients. Quantization unit 146 may quantize the transform coefficients. Entropy coding unit 150 may entropy code the quantized transform coefficients and motion vectors from motion estimation unit 134 and output encoded quantized transform coefficients and motion vector information in a bitstream. Inverse quantization unit 148 may inverse quantize the quantized transform. Inverse transform unit 144 may inverse transform the transform coefficients to reconstruct the residual data. Reference frame store 132 may provide a reference frame to motion estimation unit 134 and motion compensation unit 136. Motion estimation unit 134 may generate motion vectors based on the reference frame. Motion compensation unit 136 may perform motion compensation. Reconstruction unit 140 may reconstruct a block of video data.

FIG. 3 is a conceptual diagram illustrating an example of integer samples and fractional sample positions for quarter sample luma interpolation. Using 1/4-pixel precision as an example, FIG. 3 shows the integer-pixel samples (also called full-pixel, shown in shaded blocks with upper-case letters), for example, integer-pixel sample 22, from the reference frame that may be used to interpolate a fractional pixel (also called a sub-pixel, shown in un-shaded blocks with lower-case letters) samples. There are altogether 15 sub-pixel positions, labeled "$a_{0,0}$" through "$r_{0,0}$" in FIG. 3, for example, sub-pixel position 24. In HEVC, the samples labeled $a_{0,0}$, $b_{0,0}$, $c_{0,0}$, $d_{0,0}$, $h_{0,0}$, and $n_{0,0}$ are derived by applying an 8-tap filter to the nearest integer position samples. Then, the samples labeled $e_{0,0}$, $i_{0,0}$, $p_{0,0}$, $f_{0,0}$, $j_{0,0}$, $q_{0,0}$, $g_{0,0}$, $k_{0,0}$, and $r_{0,0}$ are derived by applying an 8-tap filter to the samples $a_{0,i}$, $b_{0,i}$ and $c_{0,i}$ with i=−3..4 in the vertical direction. The 8-tap filter to be applied is shown in Table 1 below.

TABLE 1

HEVC 8-tap luma interpolation filter for quarter-pel MV accuracy

| Phase shift | Coefficients |
| --- | --- |
| 0 | {0, 0, 0, 64, 0, 0, 0, 0}, |
| 1 | {−1, 4, −10, 58, 17, −5, 1, 0}, |
| 2 | {−1, 4, −11, 40, 40, −11, 4, −1}, |
| 3 | {0, 1, −5, 17, 58, −10, 4, −1}, |

In some examples, $1/16^{th}$-MV resolution is enabled. Thus, filters with 16 different phases are being used for interpolation, as shown in Table 2 below. However, a fixed set of 8-tap filters is still utilized for interpolation. Table 2. 8-tap luma interpolation filter for $\frac{1}{16}$-pel MV accuracy

| Phase shift | Coefficients |
|---|---|
| 0 | {0, 0, 0, 64, 0, 0, 0, 0}, |
| 1 | {0, 1, −3, 63, 4, −2, 1, 0}, |
| 2 | {−1, 2, −5, 62, 8, −3, 1, 0}, |
| 3 | {−1, 3, −8, 60, 13, −4, 1, 0}, |
| 4 | {−1, 4, −10, 58, 17, −5, 1, 0}, |
| 5 | {−1, 4, −11, 52, 26, −8, 3, −1}, |
| 6 | {−1, 3, −9, 47, 31, −10, 4, −1}, |
| 7 | {−1, 4, −11, 45, 34, −10, 4, −1}, |
| 8 | {−1, 4, −11, 40, 40, −11, 4, −1}, |
| 9 | {−1, 4, −10, 34, 45, −11, 4, −1}, |
| 10 | {−1, 4, −10, 31, 47, −9, 3, −1}, |
| 11 | {−1, 3, −8, 26, 52, −11, 4, −1}, |
| 12 | {0, 1, −5, 17, 58, −10, 4, −1}, |
| 13 | {0, 1, −4, 13, 60, −8, 3, −1}, |
| 14 | {0, 1, −3, 8, 62, −5, 2, −1}, |
| 15 | {0, 1, −2, 4, 63, −3, 1, 0} |

The following describes extended merge prediction. In VTM4, the merge candidate list is constructed by including the following five types of candidates in order: 1) Spatial motion vector predictor (MVP) from spatial neighbor CUs, 2) Temporal MVP (TMVP) from collocated CUs, 3) History-based MVP (HMVP) from an FIFO table, 4) Pairwise average MVP, and 5) Zero MVs.

Video encoder 200 may signal the size of the merge list in a slice header and the maximum allowed size of the merge list in VTM4 is 6. For each CU coded in merge mode, an index of the best merge candidate may be encoded using truncated unary binarization. The first bin of the merge index is coded with context and bypass coding is used for the other bins. The generation process of each category of merge candidates is below.

Figure 4:
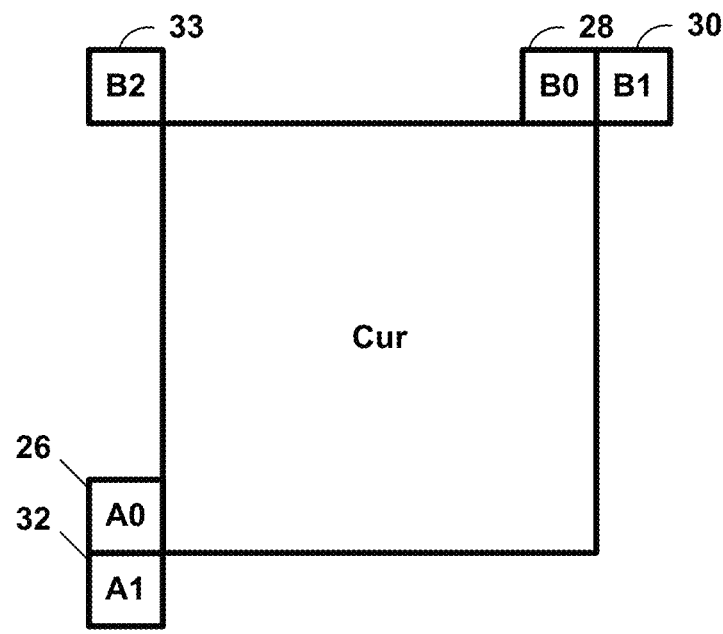
FIG. 4 is a conceptual diagram illustrating example positions of spatial merge candidates.

The following describes the derivation of spatial candidates. FIG. 4 is a conceptual diagram illustrating example positions of spatial merge candidates.

Figure 5:
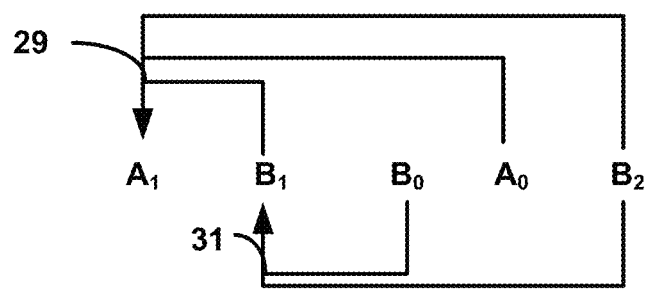
FIG. 5 is a conceptual diagram illustrating an example of candidate pairs considered for a redundancy check of spatial merge candidates.

The derivation of spatial merge candidates in VVC is same as that in HEVC. A maximum of four merge candidates are selected among candidates located in the positions depicted in FIG. 4. The order of derivation is $A_0$ 26, $B_0$ 28, $B_1$ 30, $A_1$ 32 and $B_2$ 33. Position $B_2$ 33 is considered only when any CU of position $A_0$ 26, $B_0$ 28, $B_1$ 30, and $A_1$ 32 is not available (e.g., because it belongs to another slice or tile) or is intra coded. After the candidate at position $A_1$ 32 is added, the addition of the remaining candidates is subject to a redundancy check which ensures that candidates with same motion information are excluded from the list so that coding efficiency is improved. To reduce computational complexity, not all possible candidate pairs are considered in the mentioned redundancy check. FIG. 5 is a conceptual diagram illustrating an example of candidate pairs considered for a redundancy check of spatial merge candidates. Only the pairs linked with an arrow, e.g., arrow 29 or arrow 31, in FIG. 5 are considered and a candidate is only added to the list if the corresponding candidate used for redundancy check does not have the same motion information.

Figure 6:
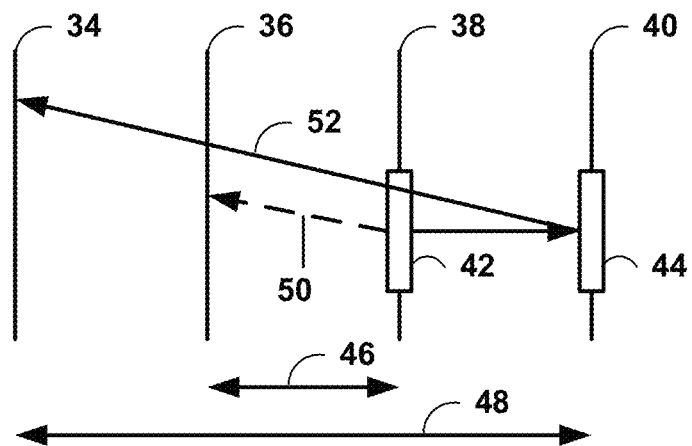
FIG. 6 is a conceptual diagram illustrating an example of motion vector scaling for a temporal merge candidate.

The following describes the derivation of temporal candidates. FIG. 6 is a conceptual diagram illustrating an example of motion vector scaling for a temporal merge candidate. In some examples, only one temporal candidate is added to the list. Particularly, in the derivation of the temporal merge candidate, a scaled motion vector is derived based on a co-located CU belonging to the collocated reference picture. The reference picture list to be used for derivation of the co-located CU is explicitly signaled in the slice header. For example, video encoder 200 may signal the reference picture list used for derivation of the co-located CU in a slice header in a bitstream and video decoder 300 may determine the reference picture list by reading the signaling in the bitstream. Scaled motion vector 50 for a temporal merge candidate for current CU 42 is obtained as illustrated by the dashed line in FIG. 6, which is scaled from motion vector 52 of co-located CU 44 using the picture order count (POC) distances, tb 46 and td 48, where tb is defined to be the POC difference between the reference picture of the current picture (reference picture 36) and the current picture (current picture 38) and td is defined to be the POC difference between the reference picture of the co-located picture (reference picture 34) and the co-located picture (co-located picture 40). The reference picture index of temporal merge candidate is set equal to zero.

Figure 7:
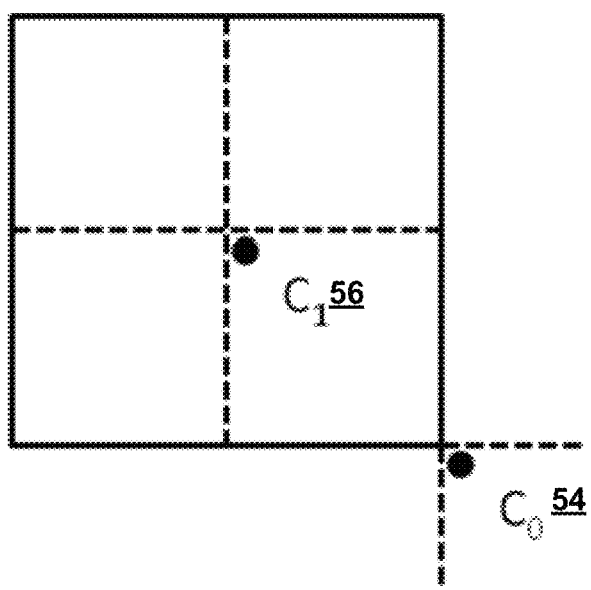
FIG. 7 is a conceptual diagram illustrating examples of candidate positions for temporal merge candidates.

FIG. 7 is a conceptual diagram illustrating examples of candidate positions for temporal merge candidates. The position for the temporal candidate is selected between candidates at position $C_0$ 54 and position $C_1$ 56, as depicted in FIG. 7. If the CU at position $C_0$ 54 is not available, is intra coded, or is outside of the current row of coding tree units (CTUs), the candidate at position $C_1$ 56 is used. Otherwise, position $C_0$ 54 is used in the derivation of the temporal merge candidate.

The following describes the derivation of history-based merge candidates. The HMVP merge candidates are added to the merge list after the spatial MVP and TMVP. In the HMVP technique, the motion information of a previously coded block is stored in a table and used as an MVP for the current CU. The table is maintained with multiple HMVP candidates during the encoding/decoding process. The table is reset (emptied) when a new CTU row is encountered. Whenever there is a non-subblock inter-coded CU, the associated motion information is added to the last entry of the table as a new HMVP candidate.

In VTM4, the HMVP table size S is set to be 6, which indicates up to 6 HMVP candidates may be added to the table. When inserting a new motion candidate to the table, a constrained first-in-first-out (FIFO) rule is utilized wherein a redundancy check is first applied to find whether there is an identical HMVP candidate in the table. If found, the identical HMVP candidate is removed from the table and all the HMVP candidates that follow the removed HMVP candidate are moved forward in the table.

HMVP candidates may be used in the merge candidate list construction process. For example, the latest several HMVP candidates in the table may be checked in order and inserted to the candidate list after the TMVP candidate. A redundancy check may be applied on the HMVP candidates comparing the HMVP candidates to the spatial or temporal merge candidate(s).

To reduce the number of redundancy check operations, the following simplifications are included: 1) The number of HMPV candidates used for merge list generation is set as (N<=4)? M: (8−N), wherein N indicates number of existing candidates in the merge list and M indicates number of available HMVP candidates in the table; and 2) Once the total number of available merge candidates reaches the maximally allowed merge candidates minus 1, the HMVP portion of the merge candidate list construction process is terminated.

The following describes the derivation of pair-wise average merge candidates. Pairwise average candidates are generated by averaging predefined pairs of candidates in the existing merge candidate list, and the predefined pairs are defined as {(0, 1), (0, 2), (1, 2), (0, 3), (1, 3), (2, 3)}, where the numbers denote the merge indices to the merge candidate list. The averaged motion vectors are calculated separately for each reference list. If both motion vectors are available in one list, these two motion vectors are averaged even when the motion vectors point to different reference pictures; if only one motion vector is available, that motion vector is used directly (e.g., not averaged); if no motion vector is available, the list is set as invalid. When the merge list is not full after the pair-wise average merge candidates are added, zero MVPs are inserted at the end of the list until the maximum merge candidate number is reached.

The following describes MMVD. In addition to merge mode, where the implicitly derived motion information is directly used for the generation of prediction samples for the current CU, MMVD is introduced in the VVC standard. Video encoder 200 may signal an MMVD flag right after sending a skip flag and merge flag to specify whether MMVD mode is used for a CU.

In MMVD, after a merge candidate is selected, the candidate is further refined by the signaled MVD's information. The signaled MVD's information includes a merge candidate flag, an index to specify motion magnitude, and an index for an indication of motion direction. In MMVD mode, one for the first two candidates in the merge list is selected to be used as the basis for the MV. Video encoder 200 may signal the merge candidate flag to specify which of the two candidates is used as the basis for the MV.

Figure 8B:
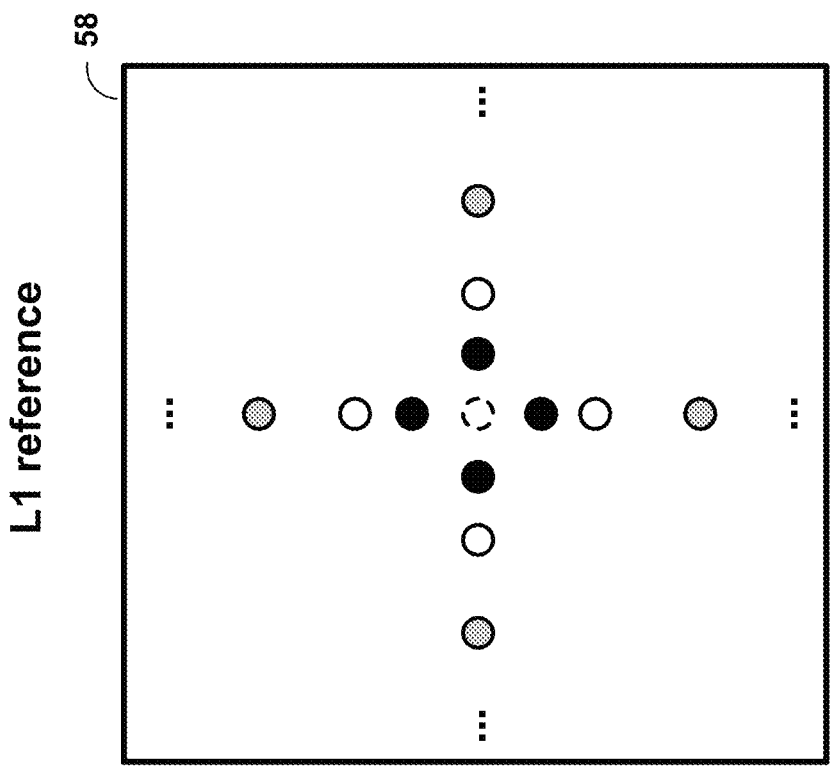
FIGS. 8A and 8B are conceptual diagrams illustrating examples of search points for merge mode with motion vector difference (MMVD).
Figure 8A:
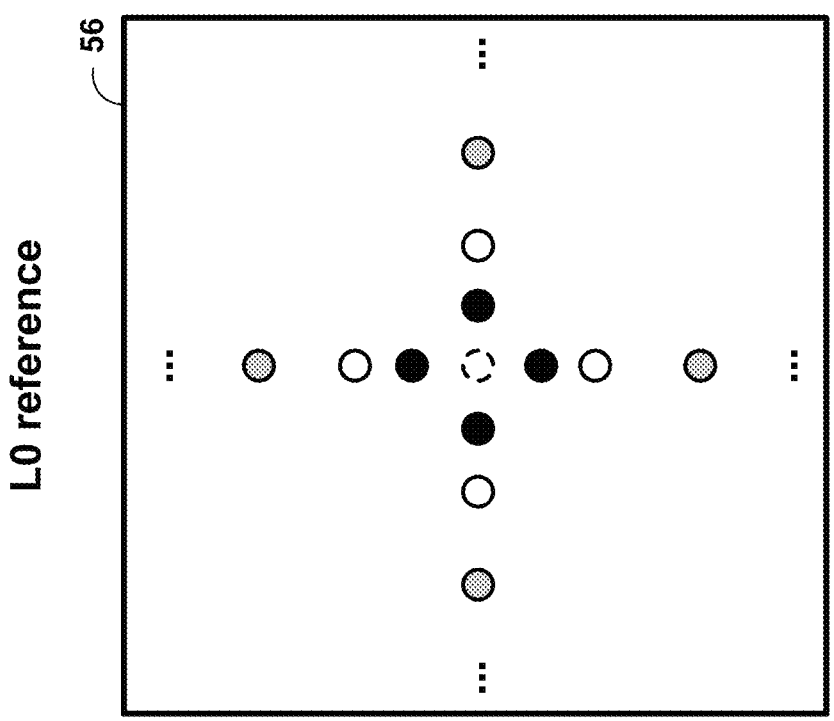

The distance index specifies motion magnitude information and indicates the pre-defined offset from the starting point (e.g., the MV). FIGS. 8A and 8B are conceptual diagrams illustrating examples of search points for merge mode with motion vector difference (MMVD). As shown in FIGS. 8A and 8B, an offset is added to either horizontal component or vertical component of a starting MV. FIG. 8A depicts a plurality of L0 (list0) reference 56 offsets and FIG. 8B depicts a plurality of L1(list1) reference 58 offsets. The relation of distance index and pre-defined offset is specified in the Table 3.

TABLE 3

The relation of distance index and pre-defined offset

| Distance IDX | 0 | 1 | 2 | 3 | 4 | 5 | 6 | 7 |
|---|---|---|---|---|---|---|---|---|
| Offset (in unit of luma sample) | ¼ | ½ | 1 | 2 | 4 | 8 | 16 | 32 |

The direction index represents the direction of the MVD relative to the starting point. The direction index can represent any of the four directions shown in Table 4 below for the sign of the MV offset specified by the direction index. The meaning of the MVD sign in Table 4 could vary according to information relating to the starting MV(s). When the starting MV(s) is a uni-prediction MV, or are bi-prediction MVs with the MV in both L0 (list0) and L1 (list1) pointing to the same side of the current picture (e.g., the POCs of the two references are both larger than the POC of the current picture, or are both smaller than the POC of the current picture), the sign in Table 4 specifies the sign of the MV offset added to the starting MV. When the starting MVs are bi-prediction MVs with the two MVs pointing to different sides of the current picture (e.g., the POC of one reference is larger than the POC of the current picture, and the POC of the other reference is smaller than the POC of the current picture), the sign in Table 4 below specifies the sign of the MV offset added to the list0 MV component of the starting MV (e.g., the MV that points to a reference picture identified in reference picture list0) and the sign for the list1 MV component has the opposite value (e.g., the MV that points to a reference picture identified in reference picture list 1).

TABLE 4

Sign of MV offset specified by direction index

| Direction IDX | 00 | 01 | 10 | 11 |
|---|---|---|---|---|
| x-axis | + | − | N/A | N/A |
| y-axis | N/A | N/A | + | − |

Figure 9A:
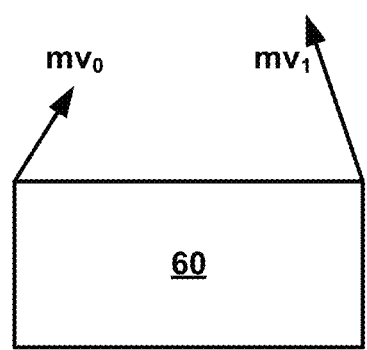
FIGS. 9A and 9B are conceptual diagrams illustrating examples of a 4-parameter affine model and a 6-parameter affine model, respectively.
Figure 9B:
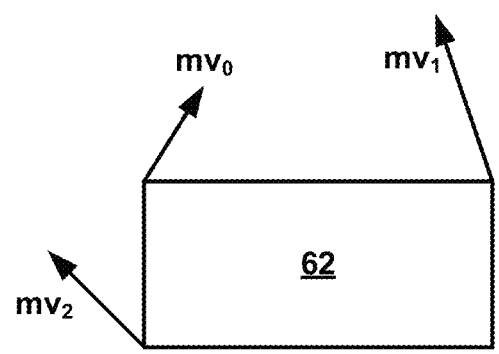

The following describes affine mode. In HEVC, only a translation motion model is applied for motion compensation prediction (MCP). While in the real world, there are many kinds of motion, e.g., zoom in/out, rotation, perspective motions and other irregular motions. In some examples, a simplified affine transform motion compensation prediction is applied. FIGS. 9A and 9B are conceptual diagrams illustrating examples of a 4-parameter affine model and a 6-parameter affine model, respectively. As shown in FIGS. 9A and 9B, the affine motion field of the block is described by two or three control point motion vectors (CPMV). In FIG. 9A the affine motion field of block 60 is described by two CPMVs ($mv_0$ and $mv_1$), while in FIG. 9B, the affine motion field of block 62 is described by three CPMVs ($mv_0$, $mv_1$ and $mv_2$).

The motion vector field (MVF) of a block of a 4-parameter affine model and a 6-parameter affine model is described by the following two equations:

$$\begin{cases} mv_x = \frac{(mv_{1x} - mv_{0x})}{w}x - \frac{(mv_{1y} - mv_{0y})}{w}y + mv_{0x} \\ mv_y = \frac{(mv_{1y} - mv_{0y})}{w}x + \frac{(mv_{1x} - mv_{0x})}{w}y + mv_{0y} \end{cases} \quad (1)$$

$$\begin{cases} mv_x = \frac{(mv_{1x} - mv_{0x})}{w}x - \frac{(mv_{2x} - mv_{0x})}{h}y + mv_{0x} \\ mv_y = \frac{(mv_{1y} - mv_{0y})}{w}x + \frac{(mv_{2y} - mv_{0y})}{h}y + mv_{0y} \end{cases} \quad (2)$$

where ($mv_{0x}$, $mv_{0y}$), ($mv_{1x}$, $mv_{1y}$), ($mv_{2x}$, $mv_{2y}$) are motion vectors of the top-left, top-right, and bottom-left corner control point. (in the case of a 6-parameter affine model).

Figure 10:
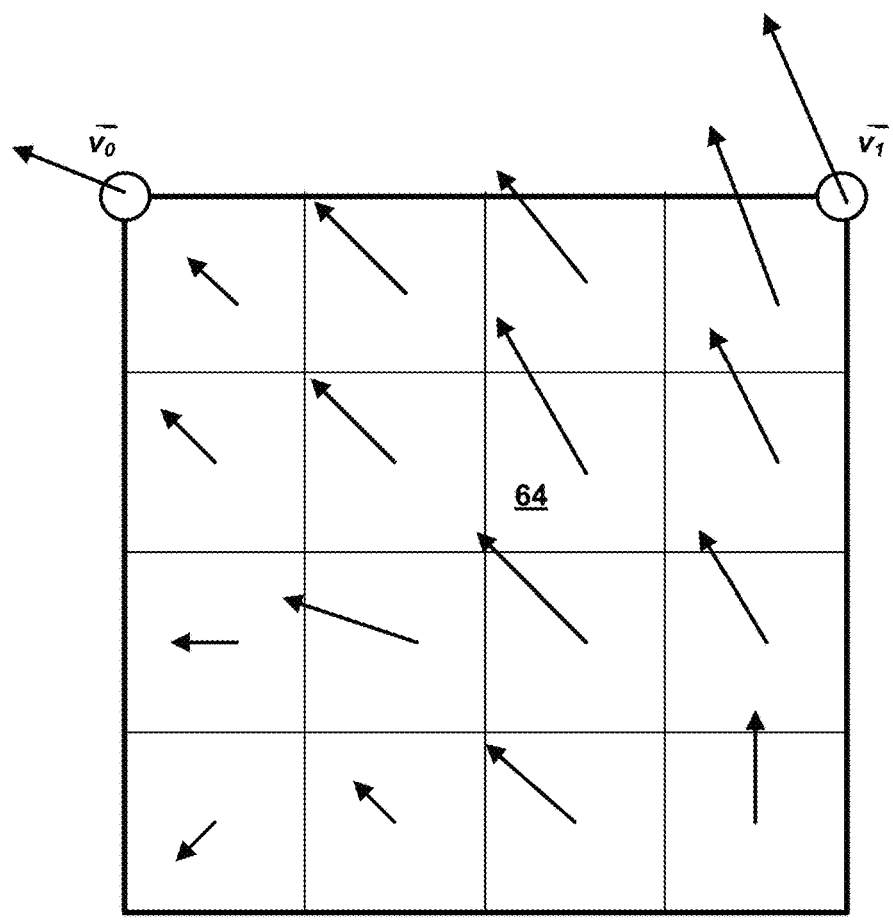
FIG. 10 is a conceptual diagram illustrating an example of an affine motion vector (MV) field per sub-block.

In order to further simplify MCP, a sub-block based affine transform prediction with block size 4×4 may be applied. FIG. 10 is a conceptual diagram illustrating an example of an affine motion vector (MV) field per sub-block. To derive a motion vector of each 4×4 sub-block, the motion vector of the center sample of each sub-block, as shown in FIG. 10, is calculated according to Equation (1) or (2) and rounded to 1/16 fraction accuracy. For example, video encoder 200 and video decoder 300 may calculate the motion vector of the center sample of each-sub block, such as sub-block 64. After MCP, the high accuracy motion vector of each sub-block is rounded and saved with the same accuracy as the normal motion vector.

The following describes overlapped block motion compensation (OBMC). OBMC has previously been used in H.263. In some examples, unlike in H.263, OBMC can be switched on and off using syntax at the CU level. In some examples, when OBMC is used, the OBMC is performed for all motion compensation (MC) block boundaries except the right and bottom boundaries of a CU. Moreover, OBMC is applied for both the luma and chroma components.

Figure 11:
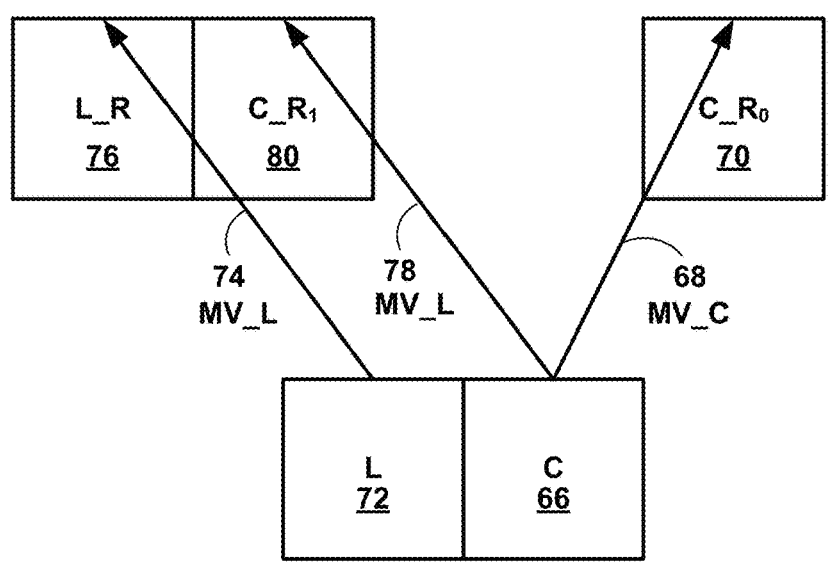
FIG. 11 is a conceptual diagram illustrating an example of overlapped block motion compensation (OBMC).

FIG. 11 is a conceptual diagram illustrating an example of overlapped block motion compensation (OBMC). Current block C 66 has its own MV MV_C 68 pointing to C 66's reference block C_$R_0$ 70. L 72 is C 66's left neighboring block. L 72 also has its own MV MV_L 74 pointing to L 72's reference block L_R 76. C 66 can use MV_L 74 (shown as MV_L 78) to get another reference block C_$R_1$ 80. C_$R_0$ 70 and C_$R_1$ 80 may be multiplied by weighting factors and added together to form the final prediction signal of C 66. C_$R_1$ 80 helps reduce the boundary effect between L 72 and C 66 due to being beside L_R 76.

Figure 12A:
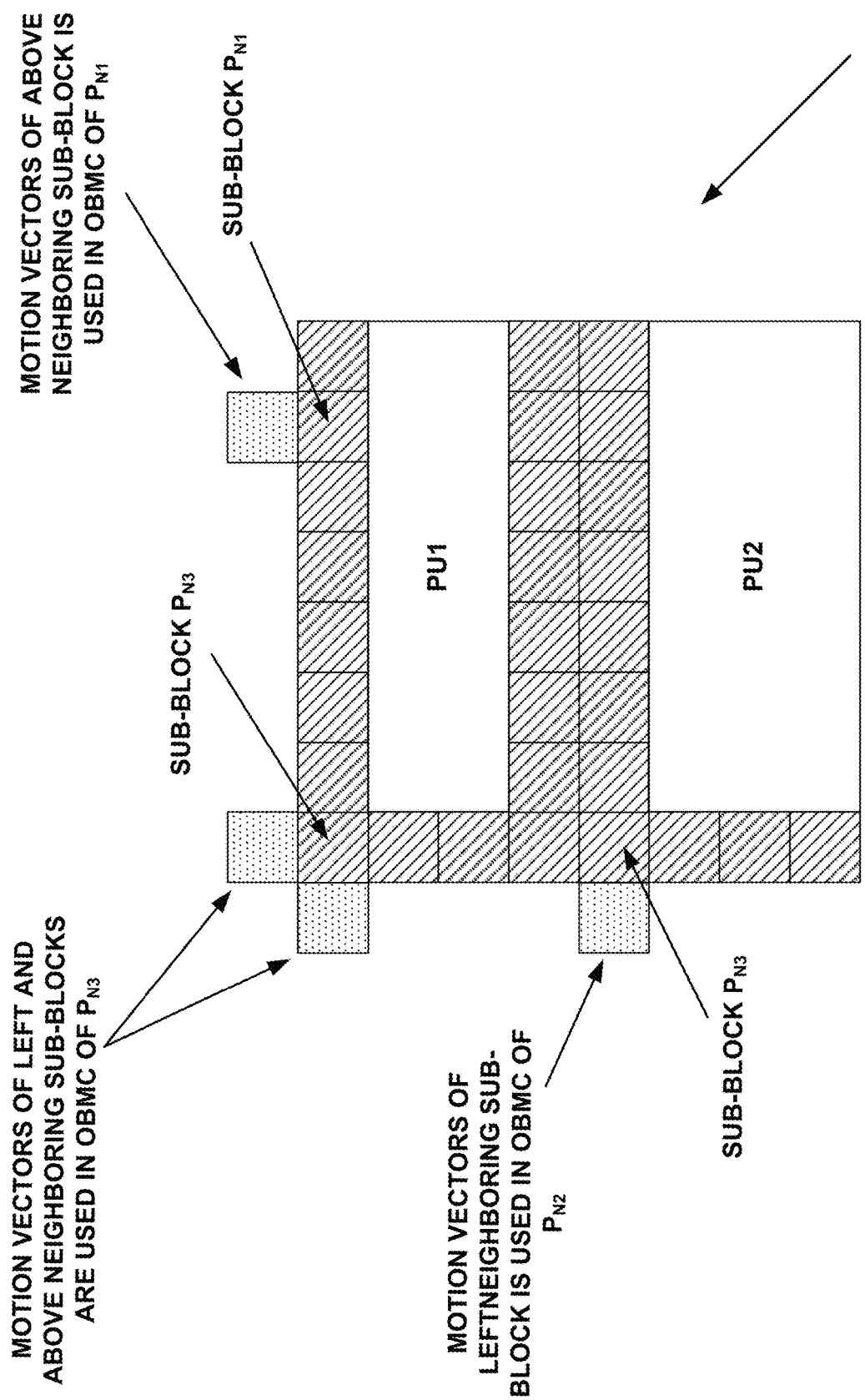
FIG. 12A is a conceptual diagram illustrating sub-blocks where OBMC applies for sub-blocks at a coding unit (CU)/prediction unit (PU) boundary.
Figure 12B:
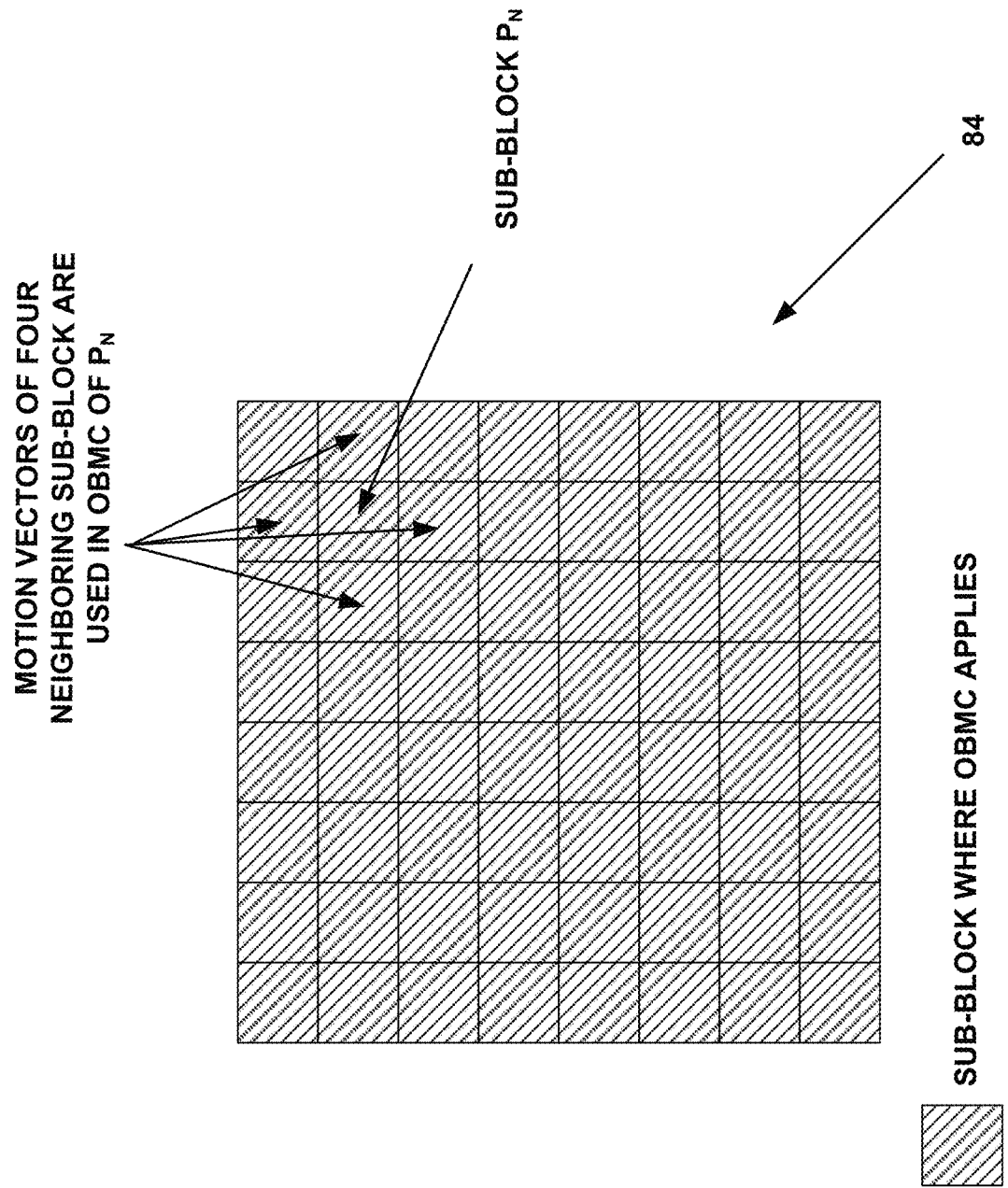
FIG. 12B is a conceptual diagram illustrating sub-blocks where OBMC applies for sub-blocks in advanced motion vector prediction (AMVP) mode.

FIG. 12A is a conceptual diagram illustrating sub-blocks where OBMC applies for sub-blocks at a coding unit (CU) and/or prediction unit (PU) boundary. FIG. 12A is discussed with FIG. 12B. FIG. 12B is a conceptual diagram illustrating sub-blocks where OBMC applies for sub-blocks in AMVP mode.

In some examples, a MC (motion compensation) block corresponds to a coding block. When a CU is coded with sub-CU mode (includes sub-CU merge, affine and frame rate up-conversion (FRUC) mode), each sub-block of the CU is a MC block. To process CU boundaries in a uniform fashion, a video coder, such as video encoder 200 or video decoder 300, may perform OBMC at the sub-block level for all MC block boundaries, where the sub-block size is set equal to 4×4, as illustrated in FIGS. 12A and 12B. For example, video encoder 200 or video decoder 300 may perform OBMC at the sub-block level to block 82 of FIG. 12A or to block 84 of FIG. 12B.

When OBMC applies to the current sub-block, besides current motion vectors, a video coder (e.g., video encoder 200 or video decoder 300) may use motion vectors of four connected neighbouring sub-blocks, if available and not identical to the current motion vector, to derive a prediction block for the current sub-block. The video coder may combine these multiple prediction blocks based on multiple motion vectors to generate the final prediction signal of the current sub-block.

A prediction block based on motion vectors of a neighboring sub-block is denoted as $P_N$, with N indicating an index for the neighbouring above, below, left and right sub-blocks and a prediction block based on motion vectors of the current sub-block is denoted as $P_C$. When $P_N$ is based on the motion information of a neighboring sub-block that contains the same motion information to the current sub-block, a video coder (e.g., video encoder 200 or video decoder 300) may not perform the OBMC from PN. Otherwise, the video coder may add every sample of $P_N$ to the same sample in $P_C$, e.g., four rows/columns of $P_N$ are added to $P_C$. The video coder may use the weighting factors $\{1/4, 1/8, 1/16, 1/32\}$ for $P_N$ and may use the weighting factors $\{3/4, 7/8, 15/16, 31/32\}$ for $P_C$. The exceptions are small MC blocks (e.g., when height or width of the coding block is equal to 4 or a CU is coded with sub-CU mode), for which the video coder may only add two rows/columns of $P_N$ to $P_C$. In this case, the video coder may use weighting factors $\{1/4, 1/8\}$ for $P_N$ and use weighting factors $\{3/4, 7/8\}$ for $P_C$. For PN generated based on motion vectors of vertically (horizontally) neighboring sub-block, the video coder may add samples in the same row (e.g., column) of $P_N$ to $P_C$ with a same weighting factor.

In some examples, for a CU with size less than or equal to 256 luma samples, a video encoder (e.g., video encoder 200 or in some examples, mode selection unit 202, described below, of video encoder 200) may signal a CU level flag to indicate whether OBMC is applied or not for the current CU. For the CUs with size larger than 256 luma samples or that are not coded with AMVP mode, a video coder (e.g.,video encoder 200 or video decoder 300) may apply OBMC by default. At the video encoder (e.g., video encoder 200 or in some examples, mode selection unit 202 of video encoder 200), when OBMC is applied for a CU, the impact of OBMC is determined during the motion estimation stage. The video coder (e.g., video encoder 200) may use the prediction signal formed by OBMC using motion information of the top neighboring block and the left neighboring block to compensate the top and left boundaries of the original signal of the current CU, and then apply a motion estimation process.

Figure 13A:
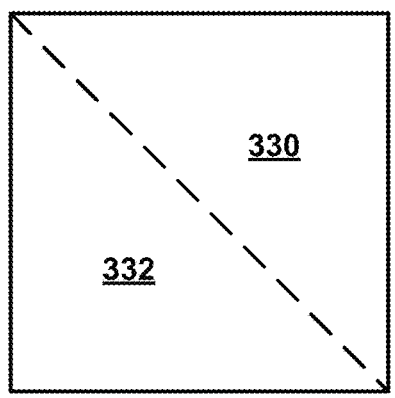
FIGS. 13A and 13B are conceptual diagrams illustrating an example of triangle partition based inter prediction.
Figure 13B:
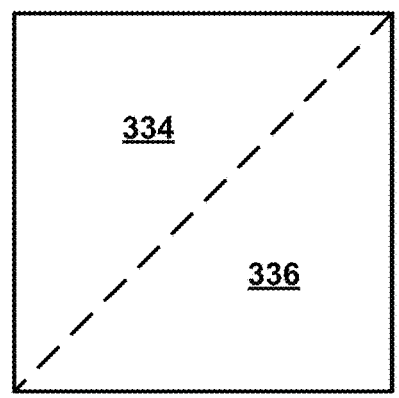

FIGS. 13A and 13B are conceptual diagrams illustrating an example of triangle partition based inter prediction. When triangle partition mode is used, a CU is split evenly into two triangle-shaped partitions, using either the diagonal split shown in FIG. 13A or the anti-diagonal split, as shown in FIG. 13B. The diagonal split in FIG. 13A divides the CU into partition 1 330 and partition 2 332. The anti-diagonal split in FIG. 13B divides the CU into partition 1 334 and partition 2 336. Each triangle partition in the CU is inter-predicted using its own motion; only uni-prediction is allowed for each partition, that is, each partition has one motion vector and one reference index. The uni-prediction motion constraint is applied to ensure that, as in conventional bi-prediction, only two motion compensated predictors are needed for each CU. The uni-prediction motion for each partition is derived from a uni-prediction candidate list constructed using the process described in section 3.4.10.1 of VTM4.

If triangle partition mode is used, then a flag indicating the direction of the triangle partition (diagonal or anti-diagonal), and two merge indices (one for each partition) are further signaled. For example, video encoder 200 may signal a flag indicative of the direction of the triangle partition and the two merge indices in a bitstream. After predicting each of the triangle partitions, the sample values along the diagonal or anti-diagonal edge are adjusted using a blending process with adaptive weights. This output of the blending process is the prediction signal for the whole CU, and transform and quantization processes are applied to the whole CU, as in other prediction modes. Finally, the motion field of the CU predicted using the triangle partition mode may be stored in 4×4 units as described in section 3.4.10.3 of VTM4.

Figure 14:
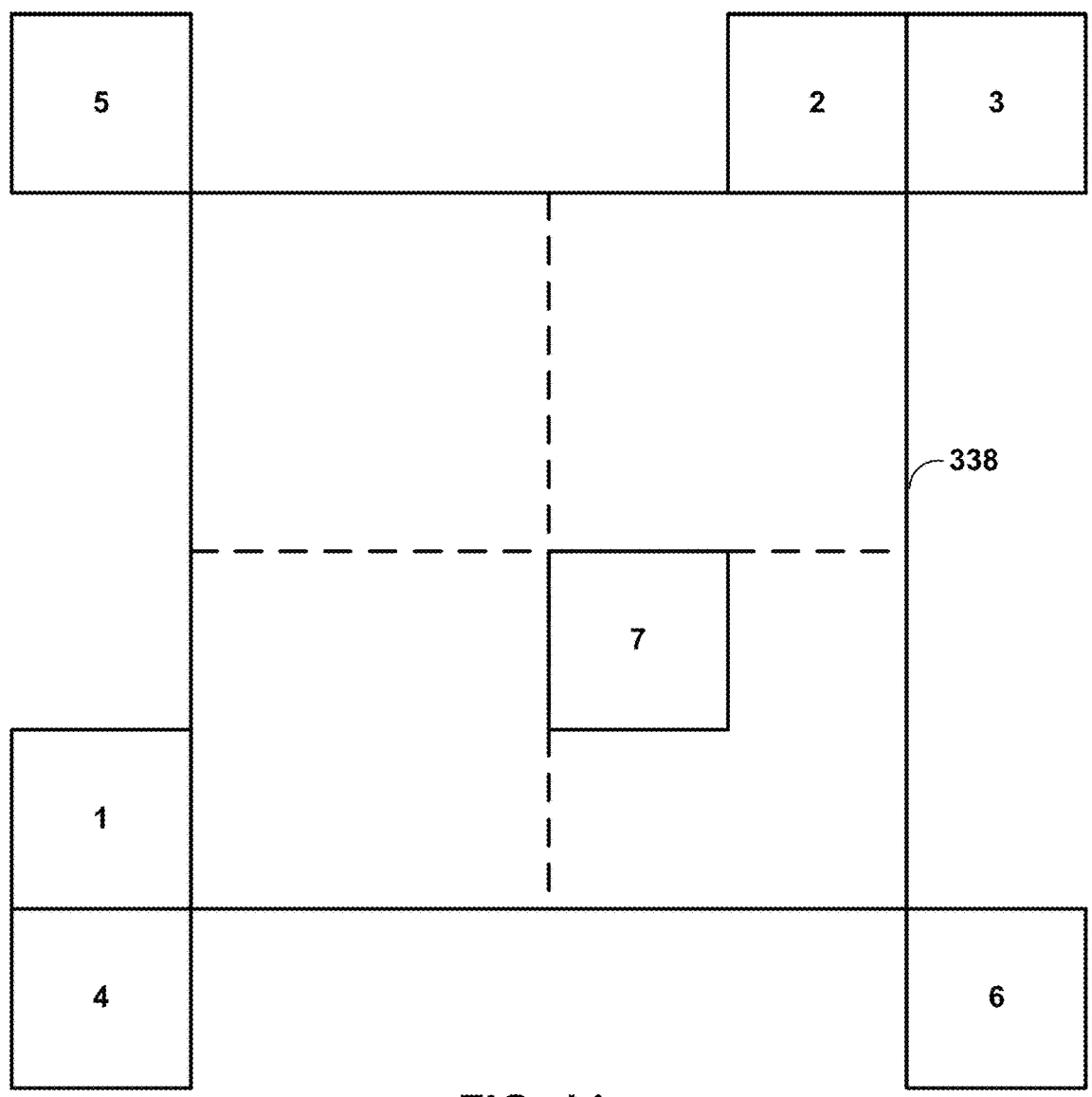
FIG. 14 is a conceptual diagram illustrating an example of spatial and temporal neighboring blocks used to construct a uni-prediction candidate list.

The following describes uni-prediction candidate list construction. FIG. 14 is a conceptual diagram illustrating an example of spatial and temporal neighboring blocks used to construct a uni-prediction candidate list. The uni-prediction candidate list consists of five uni-prediction motion vector candidates. The uni-prediction candidate list for block 338 is derived from seven neighboring blocks including five spatial neighboring blocks 1, 2, 3, 4 and 5 and two temporal co-located blocks 6 and 7 as shown in FIG. 14. The motion vectors of the seven neighboring blocks are collected and put into the uni-prediction candidate list according to the following order: first, the motion vectors of the uni-predicted neighboring blocks; then, for the bi-predicted neighboring blocks, the L0 (list0) motion vectors (that is, the L0 motion vector portions of the bi-prediction MVs), the L1 (list1) motion vectors (that is, the L1 motion vector portions of the bi-prediction MVs), and averaged motion vectors of the L0 and L1 motion vectors of the bi-prediction MVs. If the number of candidates is less than five, zero motion vectors are added to the end of the list.

Figure 15:
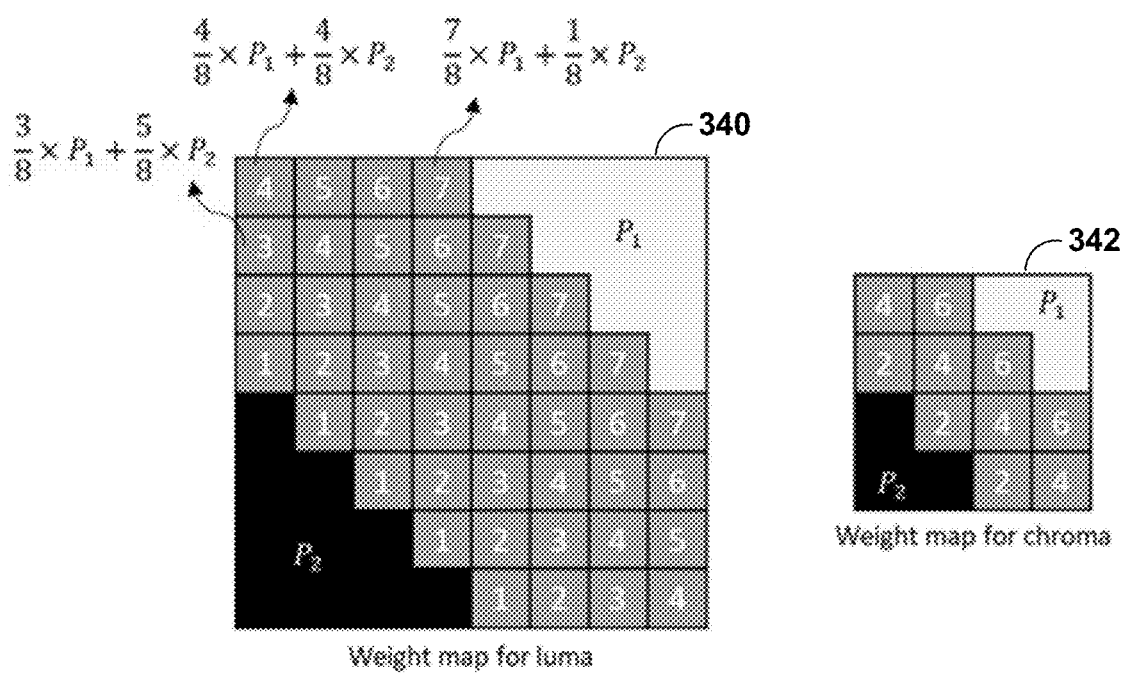
FIG. 15 is a conceptual diagram illustrating weights used in a blending process for a triangle partition edge.

The following describes blending along the triangle partition edge. FIG. 15 is a conceptual diagram illustrating weights used in a blending process for a triangle partition edge. In FIG. 15, an example weight map for luma 340 and the weight map for chroma 342 are shown. After predicting each triangle partition using the triangle partition's own motion, blending is applied to the two prediction signals to derive samples around the diagonal or anti-diagonal edge. The following weights may be used in the blending process: 7/8, 6/8, 5/8, 4/8, 3/8, 2/8, 1/8} for luma and {6/8, 4/8, 2/8} for chroma, as shown in FIG. 15.

The following describes AMVR. In HEVC, video encoder 200 may signal MVDs (between the motion vector and predicted motion vector of a CU) in units of quarter-luma-sample when use_integer_mv_flag is equal to 0 in the slice header. In VVC, a CU-level AMVR scheme is introduced. AMVR allows MVDs of the CU to be coded with different precision. Depending on the mode (normal AMVP mode or affine AMVP mode) for the current CU, the MVDs of the current CU may be adaptively selected as follows: Normal AMVP mode: quarter-luma-sample, integer-luma-sample or four-luma-sample, Affine AMVP mode: quarter-luma-sample, integer-luma-sample or 1/16 luma-sample.

Video encoder 200 may conditionally signal the CU-level MVD resolution indication if the current CU has at least one non-zero MVD component. If all MVD components (that is, both horizontal and vertical MVDs for reference list L0 (e.g., list0) and reference list L1 (e.g., list1)) are zero, video decoder 300 may infer quarter-luma-sample MVD resolution.

For a CU that has at least one non-zero MVD component, video encoder 200 may signal a first flag to indicate whether quarter-luma-sample MVD precision is used for the CU. If the first flag is 0, no further signaling is needed and quarter-luma-sample MVD precision is used for the current CU. Otherwise, video encoder 200 signals a second flag to indicate whether integer-luma-sample or four-luma-sample MVD precision is used for a normal AMVP CU. The same second flag is used to indicate whether integer-luma-sample or 1/16 luma-sample MVD precision is used for an affine AMVP CU. In order to ensure the reconstructed MV has the intended precision (quarter-luma-sample, integer-luma-sample or four-luma-sample), the motion vector predictors for the CU will be rounded to the same precision as that of the MVD before being added together with the MVD. For example, video encoder 200 and video decoder 300 may round motion vector predictors to the same precision as that of the MVD before adding the motion vector predictors to the MVD. The motion vector predictors are rounded toward zero (that is, a negative motion vector predictor is rounded toward positive infinity and a positive motion vector predictor is rounded toward negative infinity).

Video encoder 200 determines the motion vector resolution for the current CU using a rate-distortion (RD) check. To avoid always performing CU-level RD check three times for each MVD resolution, in VTM4, the RD check of MVD precisions other than quarter-luma-sample is only invoked conditionally. For normal AMVP mode, the RD cost of quarter-luma-sample MVD precision and integer-luma sample MV precision is computed first. Then, the RD cost of integer-luma-sample MVD precision is compared to that of quarter-luma-sample MVD precision to decide whether it is necessary to further check the RD cost of four-luma-sample MVD precision. When the RD cost for quarter-luma-sample MVD precision is much smaller than that of the integer-luma-sample MVD precision, the RD check of four-luma-sample MVD precision is skipped. For affine AMVP mode, if affine inter mode is not selected after checking rate-distortion costs of affine merge/skip mode, merge/skip mode, quarter-luma sample MVD precision normal AMVP mode and quarter-luma sample MVD precision affine AMVP mode, then 1/16 luma-sample MV precision and 1-pel MV precision affine inter modes are not checked. Furthermore, affine parameters obtained in quarter-luma-sample MV precision affine inter mode is used as starting search point in 1/16 luma-sample and quarter-luma-sample MV precision affine inter modes.

The following describes bi-prediction with weighted averaging (BWA). In HEVC, video encoder 200 and video decoder 300 generate the bi-prediction signal by averaging two prediction signals obtained from two different reference pictures and/or using two different motion vectors. In VTM4, the bi-prediction mode is extended beyond simple averaging to allow weighted averaging of the two prediction signals. The example equation for bi-prediction with weighted averaging is $P_{bi-pred}=((8-w)*P_0+w*P_1+4)>>3$ (3-9).

Five weights are allowed in the weighted averaging bi-prediction, $w \in \{-2, 3, 4, 5, 10\}$. For each bi-predicted CU, the weight w is determined in one of two ways: 1) for a non-merge CU, video encoder 200 may signal the weight index after the motion vector difference; 2) for a merge CU, video decoder 300 may infer the weight index from neighboring blocks based on the merge candidate index. Weighted averaging bi-prediction is only applied to CUs with 256 or more luma samples (i.e., CU width times CU height is greater than or equal to 256). For low-delay pictures, all 5 weights are used. For non-low-delay pictures, only 3 weights ($w \in \{3,4,5\}$) are used.

Video encoder 200 may apply fast search algorithms to find the weight index without significantly increasing video encoder 200's complexity. These algorithms are summarized below. Additional information is available from Huang, et al. "CE4-related: Generalized bi-prediction improvements combined from JVET-L0197 and JVET-L0296," Joint Video Experts Team (WET) of ITU-T SG 16 WP 3 and ISO/IEC JTC 1/SC 29/WG 11, 12$^{th}$ Meeting: Macao, CN, 3-12 Oct. 2018, JVET-L0646 (hereinafter "WET-L0646").

When combined with AMVR, unequal weights are only conditionally checked for 1-pel and 4-pel motion vector precisions if the current picture is a low-delay picture. When combined with affine mode, affine motion estimation may be performed for unequal weights if and only if the affine mode is selected as the current best mode. When the two reference pictures in bi-prediction are the same, unequal weights are only conditionally checked. Unequal weights are not searched when certain conditions are met, depending on the POC (picture order count) distance between current picture and the current picture's reference pictures, the coding QP, and the temporal level.

Weighted prediction (WP) is a coding tool supported by the H.264/AVC and HEVC standards to efficiently code video content with fading. Starting from VTM4, support for WP was also added into the VVC standard. WP allows weighting parameters (weight and offset) to be signaled for each reference picture in each of the reference picture lists L0 (list0) and L1 (list1). Then, during motion compensation, the weight(s) and offset(s) of the corresponding reference picture(s) are applied. WP and BWA are designed for different types of video content. In order to avoid interactions between WP and BWA, which may complicate VVC decoder design (such as video decoder 300), if a CU uses WP, then video encoder 200 does not signal the BWA weight index, and video decoder 300 infers the weight index w to be 4 (i.e., equal weight is applied).

The following describes switched interpolation filters (SIFs). The switching of the half-pel luma interpolation filter (between HEVC interpolation filter and one or two alternative filters) was proposed in Winken et al. "Non-CE4: Switched half-pel interpolation filter," Joint Video Experts Team (WET) of ITU-T SG 16 WP 3 and ISO/IEC JTC 1/SC 29/WG 11, 14$^{th}$ Meeting: Geneva, CH, 19-27 March 2019, WET-N0309.

The techniques disclosed in JVET-N0309 and the signaling of the filter index is dependent on the motion vector accuracy. In addition to the existing quarter-pel, full-pel, and 4-pel AMVR modes, a new half-pel accuracy AMVR mode was introduced. Only in case of half-pel motion vector accuracy, an alternative half-pel luma interpolation filter can be selected.

An additional AMVR mode for non-affine non-merge inter-coded CUs is possible which allows video encoder 200 to signal motion vector differences at half-pel accuracy. The existing VTM4.0 AMVR scheme thus was extended. Directly following the syntax element amvr_flag, if amvr_flag=1, there is a new context-modeled binary syntax element hpel_amvr_flag which indicates usage of the new half-pel AMVR mode if hpel_amvr_flag=1. Otherwise, e.g., if hpel_amvr_flag=0, the selection between full-pel and 4-pel AMVR mode is indicated by the syntax element amvr_precision_flag as in the current VVC draft. For example, if hpel_amvr flag=0, video encoder 200 may signal the selection of full-pel or 4-pel AMVR mode in the syntax element amvr_precision_flag.

JVET-N0309 described signaling SIF for a non-affine non-merge inter-coded CU which uses half-pel motion vector accuracy (e.g., the half-pel AMVR mode). Video decoder 300 may switch between the HEVC/VVC half-pel luma interpolation filter and one or more alternative half-pel interpolation based on the value of a new syntax element if_idx (which may be a SIF index value). In JVET-N0309, video encoder 200 only signals the syntax element if_idx in the case of half-pel AMVR mode. In case of skip/merge mode using a spatial merging candidate, the value of the syntax element if_idx is inherited from the neighboring block.

JVET-N0309 defines two 8-tap interpolation filters as an alternative to the ordinary HEVC/VVC half-pel interpolation filter. Table 6 shows the mapping between the value of the syntax element if_idx and the selected half-pel luma interpolation filter:

TABLE 6

| if_idx | Binarization | Filter | Interpolation filter coefficients |
|---|---|---|---|
| 0 | 0 | Filter 1 (8-tap) | [3, 6, 10, 13, 13, 10, 6, 3] |
| 1 | 10 | Filter 2 (8-tap) | [−1, −1, 9, 25, 25, 9, −1, −1] |
| 2 | 11 | HEVC/VVC (8-tap) | [−1, 4, −11, 40, 40, −11, 4, −1] |

Table 7 below shows the specification of the luma interpolation filter coefficients fL[p] for each 1/16 fractional sample position p.

TABLE 7

| Fractional sample position p | $f_L$[p][0] | $f_L$[p][1] | $f_L$[p][2] | $f_L$[p][3] | $f_L$[p][4] | $f_L$[p][5] | $f_L$[p][6] | $f_L$[p][7] |
|---|---|---|---|---|---|---|---|---|
| 1 | 0 | 1 | −3 | 63 | 4 | −2 | 1 | 0 |
| 2 | −1 | 2 | −5 | 62 | 8 | −3 | 1 | 0 |
| 3 | −1 | 3 | −8 | 60 | 13 | −4 | 1 | 0 |
| 4 | −1 | 4 | −10 | 58 | 17 | −5 | 1 | 0 |
| 5 | −1 | 4 | −11 | 52 | 26 | −8 | 3 | −1 |
| 6 | −1 | 3 | −9 | 47 | 31 | −10 | 4 | −1 |
| 7 | −1 | 4 | −11 | 45 | 34 | −10 | 4 | −1 |
| 8 (if idx == 2) | 3 | 6 | 10 | 13 | 13 | 10 | 6 | 3 |
| 8 (if idx == 1) | −1 | −1 | 9 | 25 | 25 | 9 | −1 | −1 |
| 8 (if idx == 0) | −1 | 4 | −11 | 40 | 40 | −11 | 4 | −1 |
| 9 | −1 | 4 | −10 | 34 | 45 | −11 | 4 | −1 |
| 10 | −1 | 4 | −10 | 31 | 47 | −9 | 3 | −1 |
| 11 | −1 | 3 | −8 | 26 | 52 | −11 | 4 | −1 |
| 12 | 0 | 1 | −5 | 17 | 58 | −10 | 4 | −1 |
| 13 | 0 | 1 | −4 | 13 | 60 | −8 | 3 | −1 |
| 14 | 0 | 1 | −3 | 8 | 62 | −5 | 2 | −1 |
| 15 | 0 | 1 | −2 | 4 | 63 | −3 | 1 | 0 |

In the following pseudo-code, underlining is used to highlight dependency of if_idx on syntax elements for AMVR (e.g., if_idx is signaled only if amvr_precision_idx [x0][y0]==1)

| coding_unit( x0, y0, cbWidth, cbHeight, treeType ) { | Descriptor |
|---|---|
|   } else if( treeType != DUAL_TREE_CHROMA ) { /* MODE_INTER or MODE_IBC */ | |
|     if ( CuPredMode[ x0 ][ y0 ] == MODE_IBC ) { | |
|       mvd_coding( x0, y0, 0, 0 ) | |
|       mvp_l0_flag[ x0 ][ y0 ] | ae(v) |
|       if( sps_amvr_enabled_flag && | |
|         ( MvdL0[ x0 ][ y0 ][ 0 ] != 0 \|\| MvdL0[ x0 ][ y0 ][ 1 ] != 0 ) ) { | |
|         amvr_precision_idx[ x0 ][ y0 ] | ae(v) |
|       } | |
|     } else { | |
|       if( ( sps_amvr_enabled_flag && inter_affine_flag == 0 && | |
|         ( MvdL0[ x0 ][ y0 ][ 0 ] != 0 \|\| MvdL0[ x0 ][ y0 ][ 1 ] != 0 \|\| | |
|         MvdL1[ x0 ][[ y0 ][ 0 ] != 0 \|\| MvdL1[ x0 ][ y0 ][ 1 ] != 0 \|\| | |
| ... ) { | |
|         amvr_flag[ x0 ][ y0 ] | ae(v) |
|         if( amvr_flag[ x0 ][ y0 ] ) { | |
|           amvr_precision_idx[ x0 ][ y0 ] | ae(v) |
|         if( tile_group_hpel_if_enabled_flag && amvr_precision_idx[ x0 ][ y0 ] == 1 ) | |
|           if_idx[ x0 ][ y0 ] | ae(v) |
|         } | |
|       } | | amvr_flag[x0][y0] specifies the resolution of the motion vector difference. amvr_flag[x0][y0] equal to 0 specifies that the resolution of the motion vector difference is ¼ of a luma sample. amvr_flag[x0][y0] equal to 1 specifies that the resolution of the motion vector difference is further specified by amvr_precision_idx[x0][y0].

When amvr_flag[x0][y0] is not present, amvr_flag[x0][y0] is inferred as follows:
 If MODE IBC, amvr_flag[x0][y0] is equal to 1.
 Otherwise if(CuPredMode[x0][y0] !=MODE_IBC), amvr_flag[x0][y0] is equal to 0.

amvr_precision_idx specifies that the resolution of the motion vector difference with AmvrShift as defined in Table 8 for Specification of AmvrShift. When amvr_precision_idx is not present, amvr_precision_idx is inferred to be equal to 0.

if_idx) may be made present in the merge list for all MVP candidates, even for MVP of non-half pel positions. Motion information with MVs of non-half pel position may be stored jointly with SIF parameters which have been either communicated by the syntax elements of the bitstream (e.g., through additional signaling in MMVD mode) or inherited from the merge MVP candidate (for MMVD or AMVP mode) or derived at by video encoder 200 and video decoder 300 though a certain derivation mechanism. In some non-merge modes, e.g., Merge+MVD or AMVP, the merge can provide a predictor which is at a half-pel resolution and has validated SIF parameters (if_idx) (e.g., SIF parameters that have been selected by rate-distortion optimization (RDO) by, e.g., video encoder 200). Additional MVD information signaled in such a mode may alter the final MV to be a non-half pel accuracy.

TABLE 8

Specification of AmvrShift

| | | | Amvl-Shift | |
|---|---|---|---|---|
| amvr_flag | amvr_precision_ink | inter_affine_flag = =1 | inter_affine_flag = =0 && ( !tile_group_hpel_if_enabled_flag \|\| CuPredMode[ x0 ][y0 ] = = MODE_IBC ) | inter_affine_flag = =0 && tile_group_hpel_if_enabled_flag && CuPredMode[ x0 ][y0 ] != MODE_IBC |
| 0 | — | 2 (1/4 sample) | 2 (1/4 sample) | 2 (1/4 sample) |
| 1 | 0 | 0 (1/6 sample) | 4 (1 sample) | 3 (1/2 sample) |
| 1 | 1 | 4 (1 sample) | 6 (4 samples) | 4 (1 sample) |
| I | 2 | — | — | 6 (4 samples) | hpel_if_idx[x0][y0] specifies the interploation filter coefficients used for half-sample positions. When hpel_if_idx[x0][y0] is not present, hpel_if_idx[x0][y0] is inferred to be equal to 2. MvdL0[x0][y0][0]=vdL0[x0][y0][0]<<AmvrShift.

There are several aspects of SIF designs which result in poor or inefficient video coding. The proposed SIF design in JVET-N0309 in terms of signaling is combined with AMVR signaling, and does not allow separate use of these two coding techniques. The lack of separation between SIF and AMVR may cause technical problems when a separate usage of these coding tools may be preferable. The SIF signaling mechanism described in JVET-N0309 also does not utilize certain dependencies present in different coding modes available in VVC. Additionally, in the case of merge mode, the SIF filter index inheritance is limited to the MVP candidates from spatial neighbors. These limitations and drawbacks may lead to less efficient coding and higher use of bandwidth.

The following describes example techniques that may overcome the technical problems described above, and provide a technical solution with a practical application to improve the techniques of video coding. For example, this disclosure describes several techniques to improve compression efficiency of SIF by harmonization and/or joint optimization of the SIF signaling and inheritance mechanism with other video coding tools, such as other components of Merge List construction, history-based MVP, weighted prediction, BWI, CIIP, MMVD, AMVP, DMVR and others. The example techniques described herein may be utilized individually or in any combination.

For improved inheritance of the SIF index from the merge list, the following describes general SIF parameters inheritance through the merge process. Parameters of SIF (e.g., In some examples, if_idx information inherited by the merge process may be stored for resulting MVs (even non half-pel position), even if the if_idx information was not validated for the current block/MV. In some examples, this information may be not used for a particular block/MV, but may be stored in the motion field and made available for future use through merge inheritance. By storing the if_idx information and making the if_idx information available for future use, information on SIF parameters may be propagated even if local MVs are available at a non-half pel position.

For example, video encoder 200 (e.g., motion compensation unit 224 which may use SIFs 225 both described below) or video decoder 300 (e.g., motion compensation unit 316 which may use SIFs 317 both described below) may determine a SIF parameter for a merge list candidate of the video data. Video encoder 200 (e.g., motion compensation unit 224) or video decoder 300 (e.g., motion compensation unit 316) may perform a merge process. Video encoder 200 (e.g., motion compensation unit 224) or video decoder 300 (e.g., motion compensation unit 316) may store the SIF parameter for a MV resulting from the merge process regardless of whether the SIF parameter is validated for the MV (e.g., regardless of whether SIF parameters that have been selected by rate-distortion optimization (RDO) by, e.g., video encoder 200). Video encoder 200 (e.g., motion compensation unit 224) or video decoder 300 (e.g., motion compensation unit 316) may code the video data based on the MV.

In some examples, the final MV produced with the MVD information (e.g., in MMVD or AMVP) may be restricted to a half-pel position, e.g., if a merge MVP candidate features an available SIF parameter. In some examples, this restriction may be imposed on the final MV as a clipping to the nearest half-pel position or a rounding, either per component, or for both components. In some examples, restrictions may be imposed on a component (mv.x or mv.y) which is found at a half-pel position in the merge MVP output. For example, video encoder 200 (e.g., motion compensation unit 224) or video decoder 300 (e.g., motion compensation unit 316) may restrict the MV to a half-pel position. Video encoder 200 (e.g., motion compensation unit 224) or video decoder 300 (e.g., motion compensation unit 316) may restrict the MV to half-pel position by one of clipping the MV to a nearest half-pel position or rounding the MV to the nearest half-pel position.

In some examples, the availability of the SIF information from a merge MVP may be taken into consideration for altering the signaling for MMVD mode or AMVP mode. For example, video encoder 200 may alter signaling for MMVD mode or AMVP mode based on the SIF parameter being stored. For example, video encoder 200 may change the context for signaling the MMVD index based on the availability of SIF information.

The following describes techniques for a history MVP. In some examples, the example techniques may enable inheritance of the SIF index (if_idx) from the history-based MVP. For example, video encoder 200 (e.g., motion compensation unit 224 which may use SIFs 225) or video decoder 300 (e.g., motion compensation unit 316 which may use SIFs 317) may cause the SIF parameter (e.g., if_idx) to be inherited by the MV from a history-based MVP. In some examples, the example techniques may include a if_idx variable in the management of the history buffer. For example, video encoder 200 (e.g., motion compensation unit 224) or video decoder 300 (e.g., motion compensation unit 316) may utilize the SIF parameter to manage the history buffer. For example, video encoder 200 and video decoder 300 may conduct pruning operations (checking for MV redundancy) taking into account if_idx prior to including MV information (reference index, prediction direction, motion vectors and if_idx) in the history buffer.

In some examples for a temporal MVP (TMVP), the example techniques may enable inheritance of the SIF index (if_idx) from the TMVP. For example, video encoder 200 (e.g., motion compensation unit 224 which may use SIFs 225) or video decoder 300 (e.g., motion compensation unit 316 which may use SIFs 317) may cause a SIF parameter (e.g., if_idx) to be inherited by the MV from a temporal MVP. The example techniques may also include the if_idx variable in motion information storage. In cases where motion information for a TMVP is compressed to a certain granularity (e.g., 8×8), video encoder 200 and video decoder 300 may apply a certain selection mechanism for selecting if_idx (e.g., if the original if_idx is on higher granularity, e.g., 4×4 block size) for storing in the temporal motion information. In some examples, video encoder 200 and video decoder 300 may restrict SIF application to block sizes equal to or larger than that utilized by MV information compression.

In some examples, for pairwise average MVP, derivation of the pairwise average MVP (PA-MVP) results in an MVP candidate including "synthetic" MV information, such that no earlier used combination of MV, reference index, or if_idx (a SIF index value) may be present at once at video decoder 300. For such a case, video encoder 200 (e.g., motion compensation unit 224 which may use SIFs 225) or video decoder 300 (e.g., motion compensation unit 316 which may use SIFs 317) may utilize any of the following if_idx inheritance logic or any combination thereof:

a. In some examples, a default if_idx variable may be defined for use for PA-MVP candidate. For example, the default if_idx may be set to equal to an integer value (e.g., 0, 1, 2, 3, etc.) or the value that may point to an HEVC filter.

b. In some examples, an if_idx value may be inherited by the PA-MVP if both MV information components (e.g., both of the candidates in the pair) input to the PA-MVP consist of identical if_idx values.

c. In some examples, an if_idx value may be inherited from either MV information component input to the PA-MVP that is available (if only one component is available) or may be inherited in a specific order (e.g., if_idx from the first available PA-MVP component).

d. In some examples, an if_idx value may be inherited from MV information components input to the PA-MVP by certain selection logic, e.g., the available if_idx that specifies the filter with certain characteristics, such as the strongest Low Pass Filter properties, or the weakest available filter.

e. In some examples, if_idx value may be inherited from MV information components input to the PA-MVP by certain selection logic, e.g., the available if_idx that is statistically preferable by MVP candidates in a merge list (more often used) or alternatively that is statistically less preferable in an already constructed merge list (not used or rarely used).

For example, video encoder 200 (e.g., motion compensation unit 224) or video decoder 300 (e.g., motion compensation unit 316) may determine whether a SIF index value of a first motion vector component of a pairwise average motion vector predictor (MVP) is equal to a SIF index value of a second motion vector component of the pairwise average MVP. Based on the SIF index value of the first motion vector component being equal to the SIF index value of the second motion vector component, video encoder 200 (e.g., motion compensation unit 224) or video decoder 300 (e.g., motion compensation unit 316) may set the SIF index of the pairwise average MVP to be equal to the SIF index of the first motion vector component. Video encoder 200 (e.g., motion compensation unit 224) or video decoder 300 (e.g., motion compensation unit 316) may code the video data based on the SIF index value of the pairwise average MVP.

In some examples, the pairwise average MVP comprises a first pairwise average MVP, and wherein a second pairwise average MVP comprises a third MV component and a fourth MV component. In some examples, video encoder 200 (e.g., motion compensation unit 224) or video decoder 300 (e.g., motion compensation unit 316) may determine whether a SIF index value of the third MV component of the second pairwise average MVP is equal to a SIF index value of fourth MV component of the pairwise average MVP. Based on a SIF index value of the third MV component not being equal to a SIF index value of the fourth MV component, video encoder 200 (e.g., motion compensation unit 224) or video decoder 300 (e.g., motion compensation unit 316) may set a SIF index value of the second pairwise average MVP to a default value, such as an integer value (e.g., 0, 1, 2, 3, etc.). In some examples, based on a SIF index value of the third MV component not being equal to a SIF index value of the fourth MV component, video encoder 200 (e.g., motion compensation unit 224) or video decoder 300 (e.g., motion compensation unit 316) may set a SIF index value of the second pairwise average MVP to a first available SIF index value between the SIF index value of the third MV component and the SIF index value of the fourth MV component.

In some examples, the SIF index value of the third MV component points to a first interpolation filter and the SIF index value of the fourth MV component points to a second interpolation filter. In some examples, based on a SIF index value of the third MV component not being equal to a SIF index value of the fourth MV component, video encoder 200 (e.g., motion compensation unit 224) or video decoder 300 (e.g., motion compensation unit 316) may set a SIF index value of the second pairwise average MVP to point to the first interpolation filter or the second interpolation filter based on a relative predetermined characteristic. In some examples, the relative predetermined characteristic may be one of a stronger filter or a weaker filter.

In some examples, based on a SIF index value of the third MV component not being equal to a SIF index value of the fourth MV component, video encoder 200 (e.g., motion compensation unit 224) or video decoder 300 (e.g., motion compensation unit 316) may set a SIF index value of the second pairwise average MVP to be a SIF index value of an MVP candidate in a merge list based on a criteria. In some examples, the criteria may be one of a most often used candidate, a not used candidate or a least used candidate.

For Bi-to uni MV information conversion, for block sizes of certain size (e.g. 4×4), a certain prediction direction (e.g., bi-) may be constrained. For example, video decoder 300 may convert a bi-prediction MVP made available by the signaled merge list index into a uni-prediction MVP. The if_idx value inherited for such a block (e.g., a 4×4 block) from a bi-predicted MVP may be modified in any of the manners as follows:
 a. In some examples, a default if_idx variable may be defined for use for such blocks, e.g., if_idx=3 or an HEVC filter.
 b. In some examples, an if_idx value may be inherited if both MV information components of bi-prediction consist of identical if_idx values.
 c. In some examples, if_idx value may be inherited from either MV information component of bi-prediction (if only one component is available) or may be inherited in a specific order (e.g., if_idx from the List 0 is inherited), or may be inherited as a function of a reference index.
 d. In some examples, an if_idx value may be inherited from MV information components of bi-prediction by certain selection logic, e.g., the available if_idx that specifies the filter with certain characteristics, e.g., the strongest Low Pass Filter properties, or the weakest available filter.
 e. In some examples, an if_idx value may be inherited from MV information components of bi-prediction by certain selection logic, e.g., the available if_idx that is statistically preferable by MVP candidates in a merge list (more often used) or alternatively that is statistically less preferable in an already constructed merge list (not used or rarely used).

For example, where the current block of video data is a bi-predicted block, video encoder 200 (e.g., motion compensation unit 224) or video decoder 300 (e.g., motion compensation unit 316) may determine a current block size, where the SIF parameter is determined based on the current block size. In some examples, video encoder 200 (e.g., motion compensation unit 224) or video decoder 300 (e.g., motion compensation unit 316) may determine whether a SIF parameter for a first MV component of the bi-predicted block is equal to the SIF parameter for a second MV component of the bi-predicted block and based on the SIF parameter for the first MV component being equal to the SIF parameter for the second MV component, set the SIF parameter to be equal to the SIF parameter of the first MV component. In some examples, video encoder 200 (e.g., motion compensation unit 224) or video decoder 300 (e.g., motion compensation unit 316) may determine the SIF parameter by setting the SIF parameter to a first available of the SIF parameter of the first MV component and the SIF parameter of the second MV component.

In some examples, the SIF parameter of the first MV component points to a first interpolation filter and the SIF parameter of the second MV component points to a second interpolation filter. In some examples, video encoder 200 (e.g., motion compensation unit 224) or video decoder 300 (e.g., motion compensation unit 316) determine the SIF parameter comprises setting the SIF parameter to the SIF parameter of the first MV component or to the SIF parameter of the second MV component based on a relative predetermined characteristic. In some examples, the relative predetermined characteristic is one of a stronger filter or a weaker filter. In some examples, video encoder 200 (e.g., motion compensation unit 224) or video decoder 300 (e.g., motion compensation unit 316) determine the SIF parameter by setting the SIF parameter to equal a SIF parameter of one of a most often used candidate, a not used candidate or a least used candidate.

For SIF for merge with MVD (MMVD), in Merge+MVD, the merge process may provide a predictor which is pointing to a half-pel position and has validated (selected by RDO by, e.g., video encoder 200) SIF parameters (if_idx). Video encoder 200 may signal additional MVD information in this mode that may alter the final MV to be a non-half pel accuracy. In some examples, if_idx information may be inherited from the merge MVP and may be stored for resulting MVs, even if the if_idx information was not validated for the current block/MV and was not used for interpolation. In some examples, this if_idx information may be not used for a particular block/MV, but may be stored in the motion field and made available for future use through merge inheritance.

For example, video encoder 200 (e.g., motion compensation unit 224 which may use SIFs 225) or video decoder 300 (e.g., motion compensation unit 316 which may use SIFs 317) may determine a SIF parameter for a merge list candidate of the video data. Video encoder 200 (e.g., motion compensation unit 224) or video decoder 300 (e.g., motion compensation unit 316) may perform a merge process. Video encoder 200 (e.g., motion compensation unit 224) or video decoder 300 (e.g., motion compensation unit 316) may store the SIF parameter for a MV resulting from the merge process regardless of whether the SIF parameter is validated for the MV (e.g., regardless of whether the SIF parameters that have been selected by rate-distortion optimization (RDO) by, e.g., video encoder 200). Video encoder 200 (e.g., motion compensation unit 224) or video decoder 300 (e.g., motion compensation unit 316) may code the video data based on the MV.

In some examples, the final MV produced with the MVD information may be restricted to a half-pel position, e.g., if a merge MVP candidate features an available SIF parameter. In some examples, this restriction may be imposed to the final MV as a clipping to the nearest half-position or a rounding, either per component, or for both components. In some examples, restrictions may be imposed on a component (mv.x or mv.y) which is found at a half-pel position in a merge MVP output. For example, video encoder 200 (e.g., motion compensation unit 224) or video decoder 300 (e.g., motion compensation unit 316) may restrict the MV to a half-pel position. Video encoder 200 (e.g., motion compensation unit 224) or video decoder 300 (e.g., motion compensation unit 316) may restrict the MV to half-pel position by one of clipping the MV to a nearest half-pel position or rounding the MV to the nearest half-pel position.

The following describes dependency of SIF parameters. For block size dependency, signaling and/or application of SIF filter types may be made dependent on the block size. In some examples, a default if_idx variable may be defined for use for a block of a specific size. For example, a block size of M×N (e.g., 4×4) may have a fixed value if_idx (e.g., being equal to 2, thus allowing an HEVC filter), whereas a block size larger than M×N (e.g., M=>64 and N=>64) may have a fixed value of if_idx being equal to another value, e.g., a value of if_idx=1, thus allowing another type of filter, such as a strong low pass filter. For example, video encoder 200 (e.g., motion compensation unit 224) or video decoder 300 (e.g., motion compensation unit 316) may determine a characteristic for a current block of the video data and, based on the characteristic of the current block, constrain the SIF parameter. For example, the characteristic is one of block size or prediction type. In some examples, video encoder 200 (e.g., motion compensation unit 224) or video decoder 300 (e.g., motion compensation unit 316) may constrain the SIF parameter by setting the SIF parameter to a default value.

In some examples, certain block sizes may have a constrained SIF filter set available for signaling, e.g., having only 2 alternatives, instead of 3. For example, a block size of 4×4 may have if_idx permitted values being equal to 1 or 2, thus disallowing use of the strongest low pass filter for this block sizes. Whereas block sizes larger than M×N (e.g., M=>64 and N=>64) may have another combination of permitted if_idx values. For example, video encoder 200 (e.g., motion compensation unit 224) may constrain the SIF parameter by constraining a SIF filter set available for signaling.

In some examples, block size dependencies may be utilized through the context modeling. An example of such dependency utilization is shown in Tables 9-11 below.

TABLE 9

Example of binarization scheme for if_idx

| | if_idx | | |
|---|---|---|---|
| | 0 | 1 | 2 |
| Binarization value | 00 | 10 | 11 |

TABLE 10

Example of assignment of ctxInc to syntax elements with context coded bins

| | binIdx | | | | | |
|---|---|---|---|---|---|---|
| Syntax element | 0 | 1 | 2 | 3 | 4 | >=5 |
| amyr_precision_idx [ ][ ] | ( (cbWidth == 4) && (cbHeight == 4) ) ? 0 : 2 | ( (cbWidth == 4) && (cbHeight == 4) ) ? 1 : 3 | na | na | na | na |
| if_idx[ ][ ] | ( (cbWidth == 4) && (cbHeight == 4) ) ? 0 : 2 | ( (cbWidth == 4) && (cbHeight == 4) ) ? 1 : 3 | na | na | na | na |

TABLE 11

Example of assignment of ctxInc to syntax elements with context coded bins

| | binIdx | | | | | |
|---|---|---|---|---|---|---|
| Syntax element | 0 | 1 | 2 | 3 | 4 | >=5 |
| amyr_precision_idx[ ] [ ] | ( (cbWidth > 32) && (cbHeight > 32) ) ? 0 : 2 | ( (cbWidth > 32) && (cbHeight > 32) ) ? 1 : 3 | na | na | na | na |
| if_idx[ ][ ] | ( (cbWidth > 32) && (cbHeight > 32) ) ? 0 : 2 | ( (cbWidth == 4) && (cbHeight > 32) ) ? 1 : 3 | na | na | na | na |

For prediction direction dependency, signaling and/or application of SIF filter types may be made dependent on the prediction type, e.g., inter_pred_idc value. In some examples, a default if_idx variable may be defined for use for a block with inter_pred_idc=2, e.g., a block coded with bi-prediction, thus disallowing switching. For example, video encoder 200 (e.g., motion compensation unit 224) or video decoder 300 (e.g., motion compensation unit 316) may determine a characteristic for a current block of the video data and, based on the characteristic of the current block, constrain the SIF parameter. For example, the characteristic is one of block size or prediction type. In some examples, video encoder 200 (e.g., motion compensation unit 224) or video decoder 300 (e.g., motion compensation unit 316) may constrain the SIF parameter by setting the SIF parameter to a default value.

In some examples, blocks coded with certain prediction type (e.g., bi-prediction or uni-prediction) may have a constrained SIF filter set available for signaling, e.g., having only 2 alternatives {F1, F2}, instead of 3, {F1,F2,F3}. For example, a block coded with bi-prediction may have if_idx permitted values being equal to 1 or 2, thus disallowing use of the strongest low pass filter for this prediction type. For example, video encoder 200 (e.g., motion compensation unit 224) may constrain the SIF parameter by constraining a SIF filter set available for signaling.

In some examples, prediction direction dependencies may be utilized through context modeling. An example of such dependency utilization is shown in Tables 12 and 13 below.

TABLE 12

Example of binarization scheme for if_idx

| | if_idx | | |
|---|---|---|---|
| | 0 | 1 | 2 |
| Binarization value | 00 | 10 | 11 |

TABLE 13

Example of assignment of ctxInc to syntax elements with context coded bins

| Syntax element | binIdx | | | | | |
| --- | --- | --- | --- | --- | --- | --- |
| | 0 | 1 | 2 | 3 | 4 | >=5 |
| amvr_precision_idx[ ][ ] | (inter_pred_id c== 2 ) ? 0 : 2 | (inter_pred_idc == 2 ) ? 1 : 3 | na | na | na | na |
| if_idx[ ][ ] | (inter_pred_idc == 2 ) ? 0 : 2 | (inter_pred_idc == 2 ) ? 1 : 3 | na | na | na | na |

Figure 16:
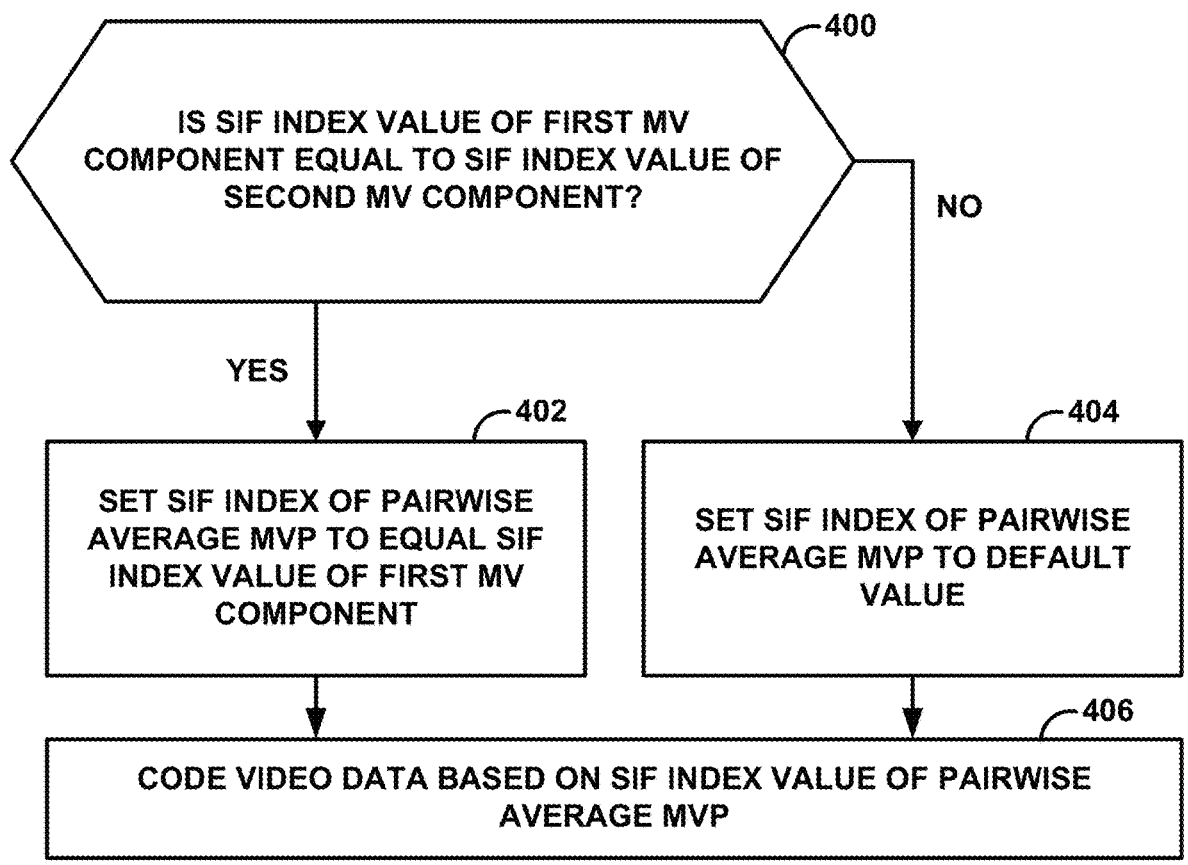
FIG. 16 is a flow diagram illustrating an example of setting an interpolation filter index of a pairwise average motion vector predictor (MVP) according to the techniques of this disclosure.

FIG. 16 is a flow diagram illustrating an example of setting an interpolation filter index of a pairwise average motion vector predictor (MVP) according to the techniques of this disclosure. Video encoder 200 (e.g., motion compensation unit 224) or video decoder 300 (e.g., motion compensation unit 316) may determine whether a SIF index value of a first motion vector component of a pairwise average motion vector predictor is equal to a SIF index value of a second motion vector component of the pairwise average motion vector predictor (400). Based on the SIF index value of the first motion vector component being equal to the SIF index value of the second motion vector component (the "YES" path in FIG. 16), video encoder 200 (e.g., motion compensation unit 224) or video decoder 300 (e.g., motion compensation unit 316) may set the SIF index of the pairwise average motion vector predictor to be equal to the SIF index of the first motion vector component (402).

In some examples, the pairwise average MVP may comprise a first pairwise average MVP, and wherein a second pairwise average MVP includes a third MV component and a fourth MV component. Video encoder 200 (e.g., motion compensation unit 224) or video decoder 300 (e.g., motion compensation unit 316) may determine whether a SIF index value of the third MV component of the second pairwise average MVP is equal to a SIF index value of fourth MV component of the pairwise average MVP (400). Based on a SIF index value of the third motion vector component not being equal to a SIF index value of the fourth motion vector component (the "NO" path of FIG. 16), video encoder 200 (e.g., motion compensation unit 224) or video decoder 300 (e.g., motion compensation unit 316) may set a SIF index value of the second pairwise average motion vector predictor to a default value, such as an integer value (e.g., 0, 1, 2, 3, etc.) or a value that may point to an HEVC filter (404). Video encoder 200 or video decoder 300 may code the video data based on the SIF index value of the first pairwise average motion vector predictor or SIF index value of the second pairwise average motion vector predictor (406).

Figure 17:
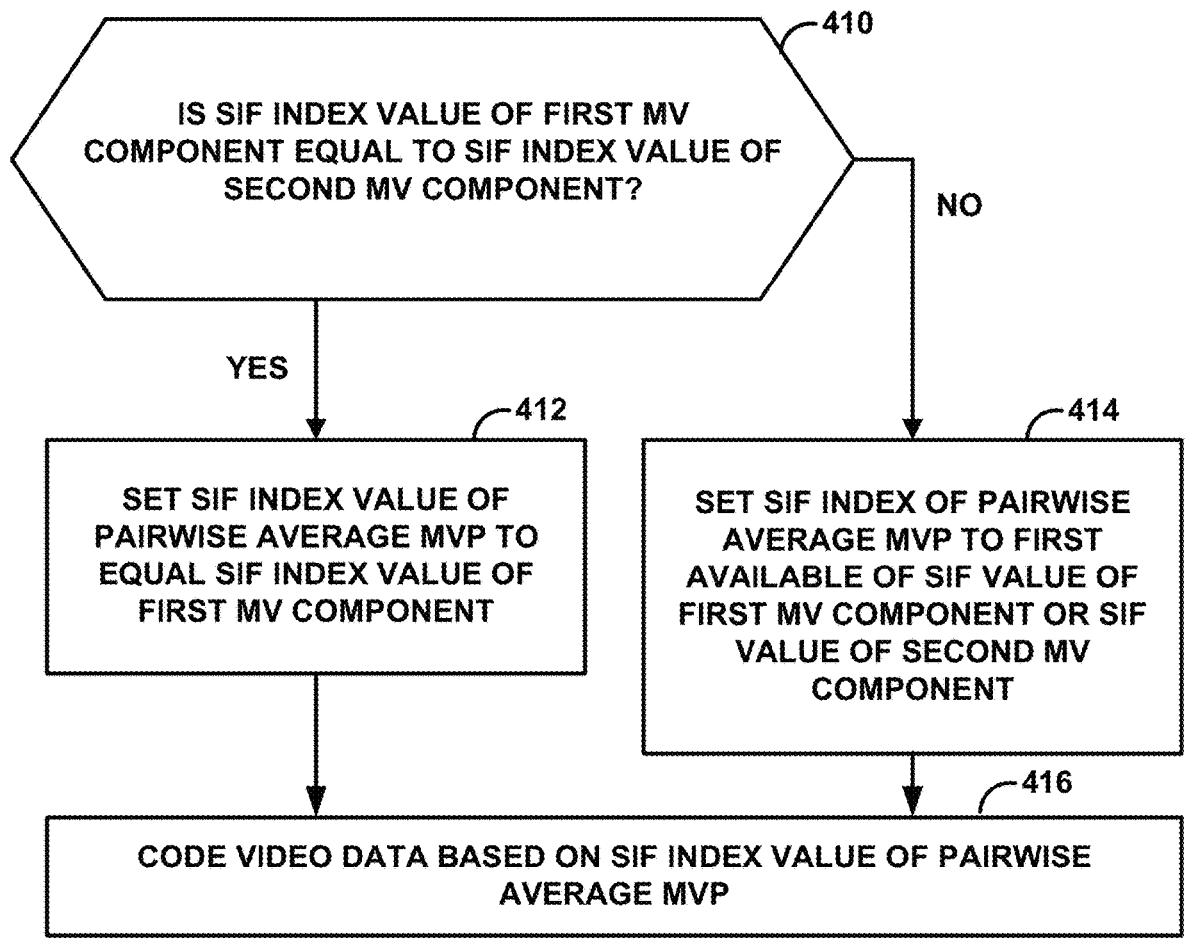
FIG. 17 is a flow diagram illustrating another example of setting an interpolation filter index of a pairwise average motion vector predictor (MVP) according to the techniques of this disclosure.

FIG. 17 is a flow diagram illustrating another example of setting an interpolation filter index of a pairwise average motion vector predictor (MVP) according to the techniques of this disclosure. Video encoder 200 (e.g., motion compensation unit 224 which may use SIFs 225) or video decoder 300 (e.g., motion compensation unit 316 which may use SIFs 317) may determine whether a SIF index value of a first motion vector component of a pairwise average motion vector predictor is equal to a SIF index value of a second motion vector component of the pairwise average motion vector predictor (410). Based on a SIF index value of the first motion vector component being equal to the SIF index value of the second motion vector component (the "YES" path in FIG. 17), video encoder 200 (e.g., motion compensation unit 224) or video decoder 300 (e.g., motion compensation unit 316) may set the SIF index of the pairwise average motion vector predictor to be equal to the SIF index of the first motion vector component (412).

In some examples, the pairwise average MVP may include a first pairwise average MVP, and wherein a second pairwise average MVP may include a third MV component and a fourth MV component. Video encoder 200 (e.g., motion compensation unit 224) or video decoder 300 (e.g., motion compensation unit 316) may determine whether a SIF index value of the third MV component of the second pairwise average MVP is equal to a SIF index value of fourth MV component of the pairwise average MVP (410). Based on a SIF index value of the third motion vector component not being equal to a SIF index value of the fourth motion vector component (the "NO" path of FIG. 17), video encoder 200 (e.g., motion compensation unit 224) or video decoder 300 (e.g., motion compensation unit 316) may set a SIF index value of the second pairwise average motion vector predictor to a first available between the SIF index value of the third motion vector component and the SIF index value of the fourth motion vector component (414). Video encoder 200 or video decoder 300 may code the video data based on the SIF index value of the first pairwise average motion vector predictor or the SIF index value of the second pairwise average motion vector predictor (416).

Figure 18:
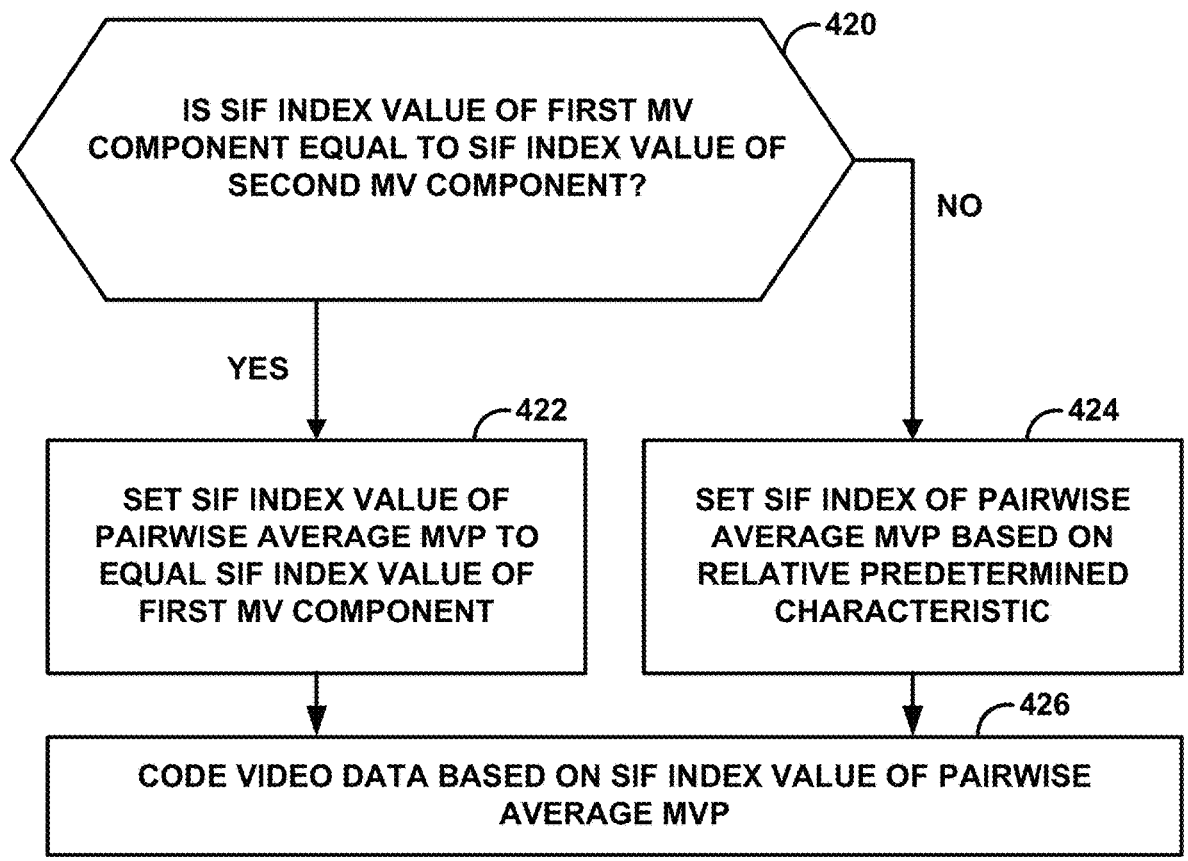
FIG. 18 is a flow diagram illustrating another example of setting an interpolation filter index of a pairwise average motion vector predictor (MVP) according to the techniques of this disclosure.

FIG. 18 is a flow diagram illustrating another example of setting a SIF index of a pairwise average motion vector predictor (MVP) according to the techniques of this disclosure. Video encoder 200 (e.g., motion compensation unit 224 which may use SIFs 225) or video decoder 300 (e.g., motion compensation unit 316 which may use SIFs 317) may determine whether a SIF index value of a first motion vector component of a pairwise average motion vector predictor is equal to a SIF index value of a second motion vector component of the pairwise average motion vector predictor (420). Based on the SIF index value of the first motion vector component being equal to the SIF index value of the second motion vector component (the "YES" path in FIG. 18), video encoder 200 (e.g., motion compensation unit 224) or video decoder 300 (e.g., motion compensation unit 316) may set the SIF index of the pairwise average motion vector predictor to be equal to the SIF index of the first motion vector component (422).

In some examples, the pairwise average MVP may comprise a first pairwise average MVP, and a second pairwise average MVP includes a third MV component and a fourth MV component. Video encoder 200 (e.g., motion compensation unit 224) or video decoder 300 (e.g., motion compensation unit 316) may determine whether a SIF index value of the third MV component of the second pairwise average MVP is equal to a SIF index value of fourth MV component of the pairwise average MVP (420). Based on a SIF index value of the third motion vector component not being equal to a SIF index value of the fourth motion vector component (the "NO" path of FIG. 18), video encoder 200 (e.g., motion compensation unit 224) or video decoder 300 (e.g., motion compensation unit 316) may set a SIF index value of the second pairwise average motion vector predictor to point to a first interpolation filter or a second interpolation filter based on a relative predetermined characteristic (424). For example, the SIF index of the third MV component may point to the first interpolation filter and the SIF index of the fourth MV component may point to the second interpolation filter. The relative characteristic may be one of a stronger filter or a weaker filter and video encoder 200 (e.g., motion compensation unit 224) or video decoder 300 (e.g., motion compensation unit 316) may set the SIF index of the second pairwise average MVP to equal the SIF index of the third MV component or the SIF index of the fourth MV component based on the relative characteristic of the filters to which the indices point. Video encoder or video decoder 300 may code the video data based on the SIF index value of the first pairwise average motion vector predictor or the SIF index value of the second pairwise average motion vector predictor (426).

Figure 19:
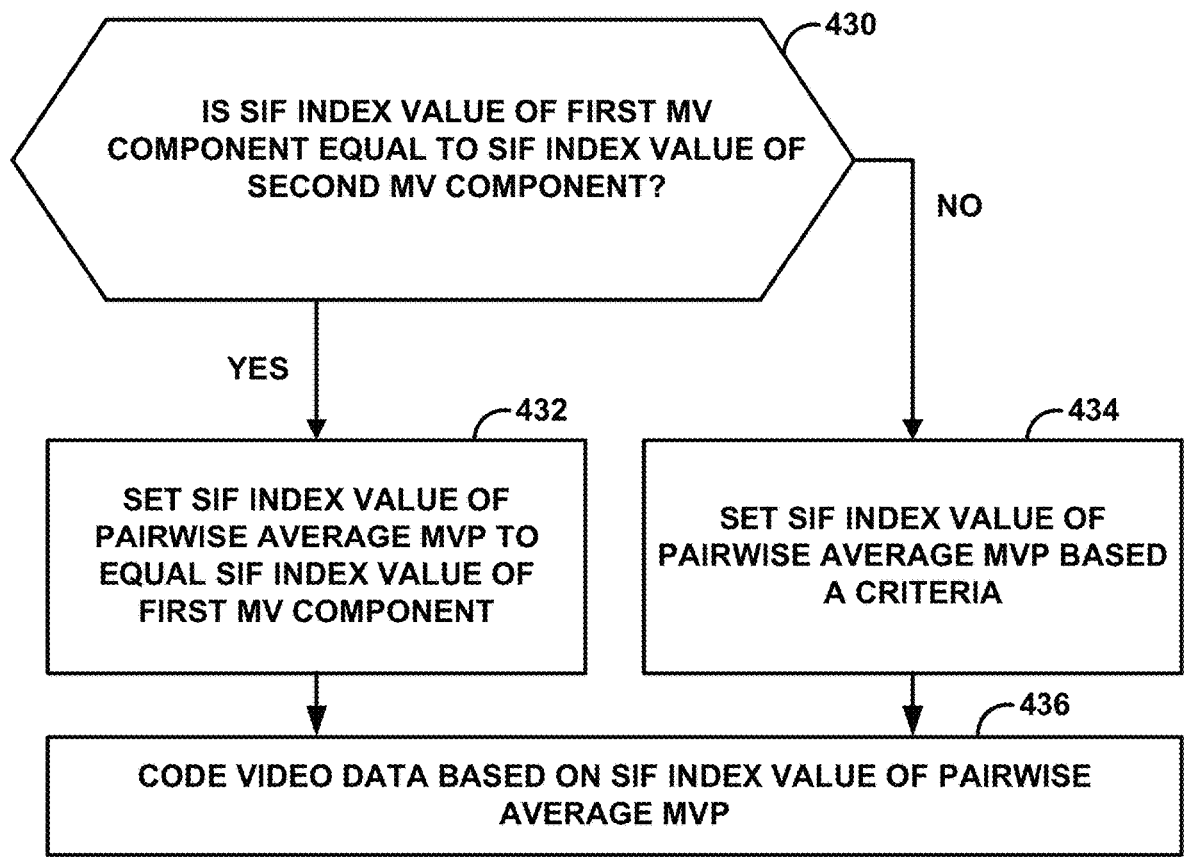
FIG. 19 is a flow diagram illustrating another example of setting an interpolation filter index of a pairwise average motion vector predictor (MVP) according to the techniques of this disclosure.

FIG. 19 is a flow diagram illustrating another example of setting a SIF index of a pairwise average motion vector predictor (MVP) according to the techniques of this disclosure. Video encoder 200 (e.g., motion compensation unit 224 which may use SIFs 225) or video decoder 300 (e.g., motion compensation unit 316 which may use SIFs 317) may determine whether a SIF index value of a first motion vector component of a pairwise average motion vector predictor is equal to a SIF index value of a second motion vector component of the pairwise average motion vector predictor (430). Based on the SIF index value of the first motion vector component being equal to the SIF index value of the second motion vector component (the "YES" path in FIG. 19), video encoder 200 (e.g., motion compensation unit 224) or video decoder 300 (e.g., motion compensation unit 316) may set the SIF index of the pairwise average motion vector predictor to be equal to the SIF index of the first motion vector component (432).

In some examples, the pairwise average MVP may comprise a first pairwise average MVP, and a second pairwise average MVP includes a third MV component and a fourth MV component. Video encoder 200 (e.g., motion compensation unit 224) or video decoder 300 (e.g., motion compensation unit 316) may determine whether a SIF index value of the third MV component of the second pairwise average MVP is equal to a SIF index value of fourth MV component of the pairwise average MVP (430). Based on a SIF index value of the third motion vector component not being equal to a SIF index value of the fourth motion vector component (the "NO" path of FIG. 19), video encoder 200 (e.g., motion compensation unit 224) or video decoder 300 (e.g., motion compensation unit 316) may set a SIF index value of the second pairwise average motion vector predictor to be a SIF index value of a motion vector predictor candidate in a merge list based on a criteria (434). For example, video encoder 200 (e.g., motion compensation unit 224) or video decoder 300 (e.g., motion compensation unit 316) may set the SIF index of the second pairwise average MVP to equal a SIF index of one of a most often used candidate, a not used candidate or a least used candidate. Video encoder 200 or video decoder 300 may code the video data based on the SIF index value of the first pairwise average motion vector predictor or the SIF index value of the second pairwise average motion vector predictor (436).

Figure 20:
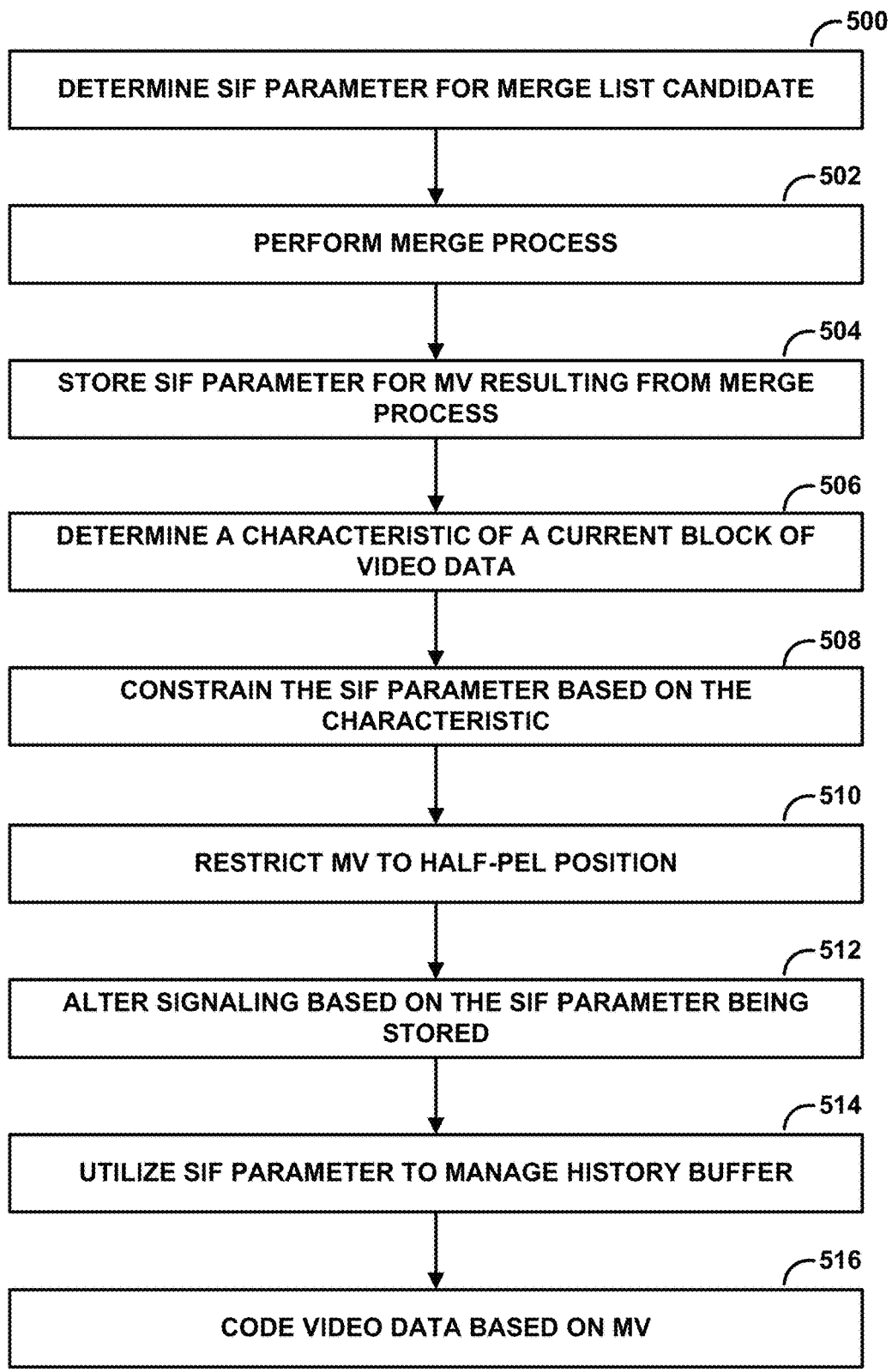
FIG. 20 is a flow diagram illustrating an example of determining a switchable interpolation filter (SIF) parameter for a motion vector (MV).

FIG. 20 is a flow diagram illustrating an example of determining a SIF parameter for an MV. Video encoder 200 (e.g., motion compensation unit 224 which may use SIFs 225) or video decoder 300 (e.g., motion compensation unit 316 which may use SIFs 317) may determine a SIF parameter for a merge list candidate (500). In some examples, the merge list candidate may be a temporal MVP. In some example, the merge list candidate may be a history-based MVP. In some examples, the merge list candidate may be a bi-prediction MVP. In some examples, the merge list candidate may be a pairwise average MVP. The SIF parameter may be a SIF index pointing to a SIF filter. Video encoder 200 (e.g., motion compensation unit 224) or video decoder 300 (e.g., motion compensation unit 316) may perform a merge process (502). For example, video encoder 200 (e.g., motion compensation unit 224) or video decoder 300 (e.g., motion compensation unit 316) may merge candidates in a merge list. Video encoder 200 (e.g., motion compensation unit 224) or video decoder 300 (e.g., motion compensation unit 316) may store the SIF parameter for an MV resulting from the merge process, regardless of whether the SIF parameter is validated for the MV (504).

In some examples, video encoder 200 (e.g., motion compensation unit 224) or video decoder 300 (e.g., motion compensation unit 316) may determine a characteristic of a current block of video data (506). For example, the characteristic may be a size of the current block (e.g., 4×4, 8×8, 16×16, 64×64, M×N where M is a block height and N is a block width) (also referred to as a current block size) or the characteristic may be a prediction type used for the current block (e.g., intra or inter).

In some examples, video encoder 200 (e.g., motion compensation unit 224) or video decoder 300 (e.g., motion compensation unit 316) determine the SIF parameter based on the characteristic, such as current block size, for example when the current block is bi-predicted. For example, video encoder 200 (e.g., motion compensation unit 224) or video decoder 300 (e.g., motion compensation unit 316) may set the SIF parameter to a default value. In some examples, video encoder 200 (e.g., motion compensation unit 224) or video decoder 300 (e.g., motion compensation unit 316) may determine the SIF parameter by determining whether a SIF parameter for a first MV component of the bi-predicted block is equal to the SIF parameter for a second MV component of the bi-predicted block and based on the SIF parameter for the first MV component being equal to the SIF parameter for the second MV component, setting the SIF parameter to be equal to the SIF parameter of the first MV component. In some examples, video encoder 200 (e.g., motion compensation unit 224) or video decoder 300 (e.g., motion compensation unit 316) may determine the SIF parameter by setting the SIF parameter to a first available of the SIF parameter of the first MV component and the SIF parameter of the second MV component. In some examples, video encoder 200 (e.g., motion compensation unit 224) or video decoder 300 (e.g., motion compensation unit 316) may determine the SIF parameter by setting the SIF parameter to the SIF parameter of the first MV component or to the SIF parameter of the second MV component based on a relative predetermined characteristic. For example, the relative predetermined characteristic may be one of a stronger filter or a weaker filter pointed to by the SIF parameter. In some examples, video encoder 200 (e.g., motion compensation unit 224) or video decoder 300 (e.g., motion compensation unit 316) may determine the SIF parameter by setting the SIF parameter to equal a SIF parameter of one of a most often used candidate, a not used candidate or a least used candidate.

In some examples, video encoder 200 (e.g., motion compensation unit 224) or video decoder 300 (e.g., motion compensation unit 316) may constrain the SIF parameter based on the characteristic (508). For example, video encoder 200 (e.g., motion compensation unit 224) or video decoder 300 (e.g., motion compensation unit 316) may constrain the SIF parameter by setting the SIF parameter to a default value. In another example, video encoder 200 (e.g., motion compensation unit 224) or video decoder 300 (e.g., motion compensation unit 316) may constrain the SIF parameter by constraining a SIF filter set available for signaling.

In some examples, video encoder 200 (e.g., motion compensation unit 224) or video decoder 300 (e.g., motion compensation unit 316) may restrict the MV to a half-pel position (510). Video encoder 200 (e.g., motion compensation unit 224) or video decoder 300 (e.g., motion compensation unit 316) may restrict the MV to a half-pel position by clipping the MV to a nearest half-pel position or by rounding the MV to the nearest half-pel position.

In some examples, video encoder 200 may alter signaling based on the SIF parameter being stored (512). For example, video encoder 200 may alter signaling for MMVP mode or for AMVP mode based on the SIF parameter being stored.

In some examples, video encoder 200 (e.g., motion compensation unit 224) or video decoder 300 (e.g., motion compensation unit 316) may utilize the SIF parameter to manage a history buffer. For example, the SIF parameter may be inherited by the MV from a history-based MVP and video encoder 200 (e.g., motion compensation unit 224) or video decoder 300 (e.g., motion compensation unit 316) may utilize the SIF parameter to perform pruning operations on contents of the history buffer. Video encoder 200 or video decoder 300 may code the video data based on the MV (516).

Figure 21:
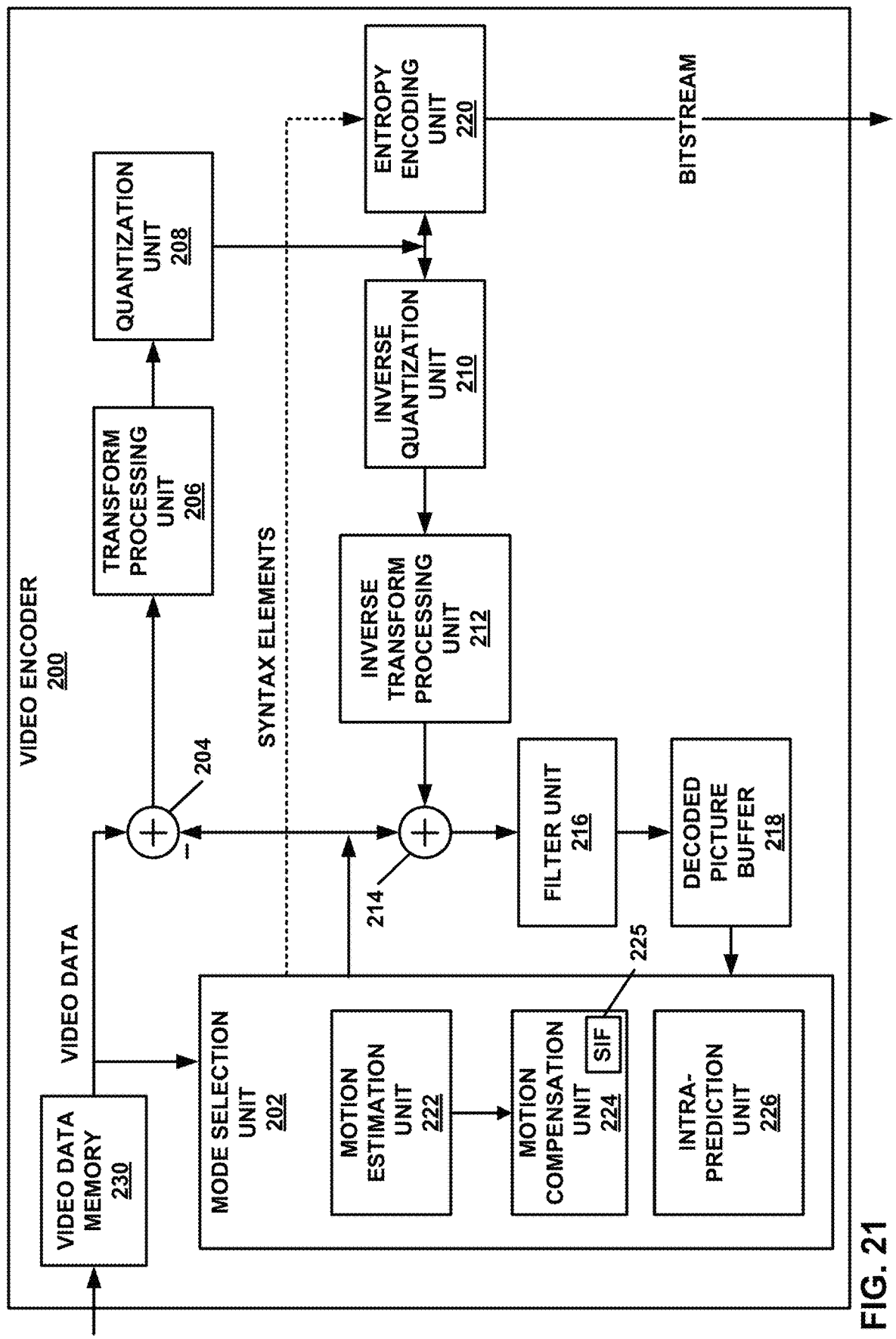
FIG. 21 is a block diagram illustrating an example video encoder that may perform the techniques of this disclosure.

FIG. 21 is a block diagram illustrating an example video encoder 200 that may perform the techniques of this disclosure. FIG. 21 is provided for purposes of explanation and should not be considered limiting of the techniques as broadly exemplified and described in this disclosure. For purposes of explanation, this disclosure describes video encoder 200 in the context of video coding standards such as the HEVC video coding standard and the H.266 video coding standard in development. However, the techniques of this disclosure are not limited to these video coding standards, and are applicable generally to video encoding and decoding.

In the example of FIG. 21, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 21 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. For example, motion compensation unit 224 may contain SIFs 225. In some examples, motion compensation unit 224 may determine whether a SIF index value of a first MV component of a pairwise average MVP is equal to a SIF index value of a second MV component of the pairwise average MVP, and if the SIF index value of the first MV component is equal to the SIF index value of the second MV component, motion compensation unit 224 may set the SIF index of the pairwise average MVP to be equal to the SIF index of the first MV component. In some examples, motion compensation unit 224 may determine a SIF parameter for a merge list candidate of the video data, perform a merge process and store the SIF parameter for an MV resulting from the merge process, regardless of whether the SIF parameter is validated for the MV.

For bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry and configured to perform the example techniques described in this disclosure.

Figure 22:
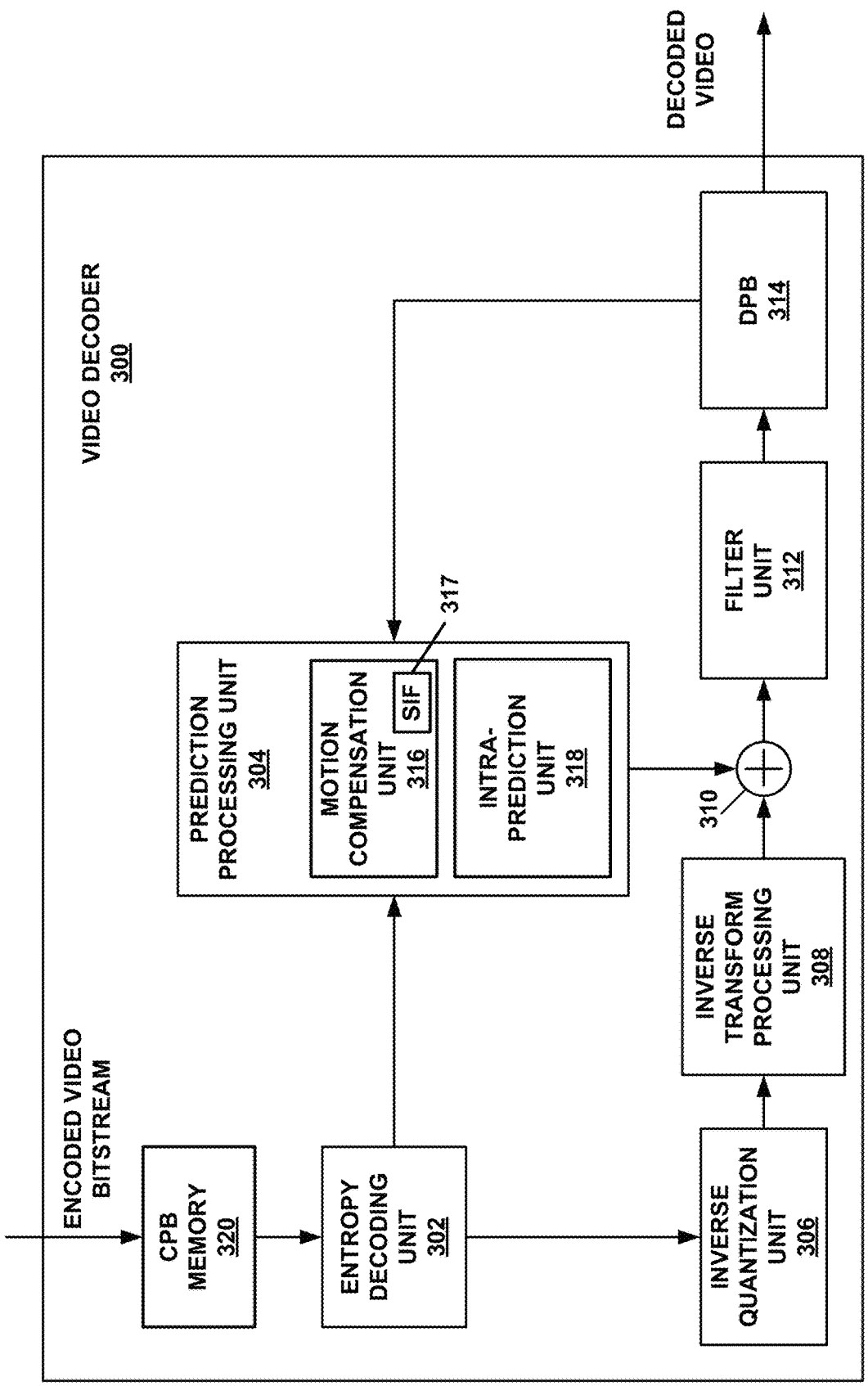
FIG. 22 is a block diagram illustrating an example video decoder that may perform the techniques of this disclosure.

FIG. 22 is a block diagram illustrating an example video decoder 300 that may perform the techniques of this disclosure. FIG. 22 is provided for purposes of explanation and is not limiting on the techniques as broadly exemplified and described in this disclosure. For purposes of explanation, this disclosure describes video decoder 300 is described according to the techniques of VVC, and HEVC. However, the techniques of this disclosure may be performed by video coding devices that are configured to other video coding standards.

In the example of FIG. 22, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 22 are illustrated to assist with understanding the operations performed by video decoder 300. The units may be implemented as fixed-function circuits, programmable circuits, or a combination thereof. Similar to FIG. 21, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 21).

Motion compensation unit 316 may contain SIFs 317. In some examples, motion compensation unit 316 may determine whether a SIF index value of a first MV component of a pairwise average MVP is equal to a SIF index value of a second MV component of the pairwise average MVP, and if the SIF index value of the first MV component is equal to the SIF index value of the second MV component, motion compensation unit 316 may set the SIF index of the pairwise average MVP to be equal to the SIF index of the first MV component. In some examples, motion compensation unit 316 may determine a SIF parameter for a merge list candidate of the video data, perform a merge process and store the SIF parameter for an MV resulting from the merge process, regardless of whether the SIF parameter is validated for the MV.

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 21). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry and configured to perform the example techniques described in this disclosure.

Figure 23:
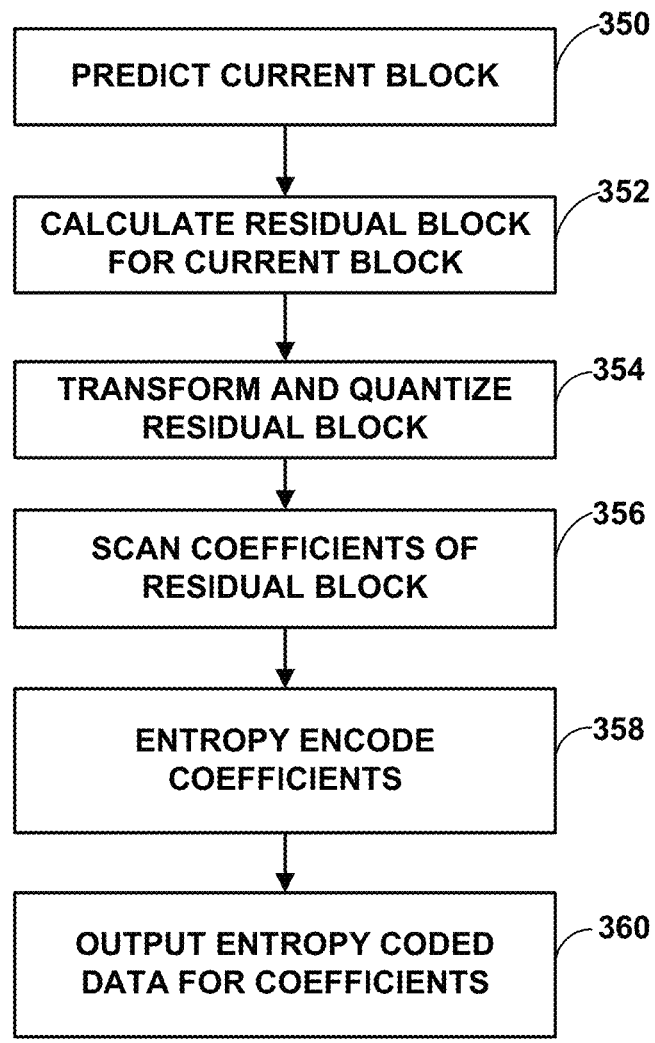
FIG. 23 is a flow diagram illustrating an example of encoding video data according to the techniques of this disclosure.

FIG. 23 is a flowchart illustrating an example method for encoding a current block. The current block may comprise a current CU. Although described with respect to video encoder 200 (FIGS. 1 and 26), it should be understood that other devices may be configured to perform a method similar to that of FIG. 23.

In this example, video encoder 200 initially predicts the current block (350). For example, video encoder 200 may form a prediction block for the current block. In some examples, as part of forming the prediction block, video encoder 200 may determine whether a SIF index value of a first MV component of a pairwise average MVP is equal to a SIF index value of a second MV component of the pairwise average MVP and if the SIF index value of the first MV component is equal to the SIF index value of the second MV component, set the SIF index of the pairwise average MVP to be equal to the SIF index of the first MV component. In some examples, as part of forming the prediction block, video encoder 200 may determine a SIF parameter for a merge list candidate of the video data, perform a merge process and storing the SIF parameter for a MV resulting from the merge process regardless of the SIF parameter being validated for the MV.

Video encoder 200 may then calculate a residual block for the current block (352). To calculate the residual block, video encoder 200 may calculate a difference between the original, unencoded block and the prediction block for the current block. Video encoder 200 may then transform and quantize coefficients of the residual block (354). Next, video encoder 200 may scan the quantized transform coefficients of the residual block (356). During the scan, or following the scan, video encoder 200 may entropy encode the coefficients (358). For example, video encoder 200 may encode the coefficients using CAVLC or CABAC. Video encoder 200 may then output the entropy coded data of the block (360).

Figure 24:
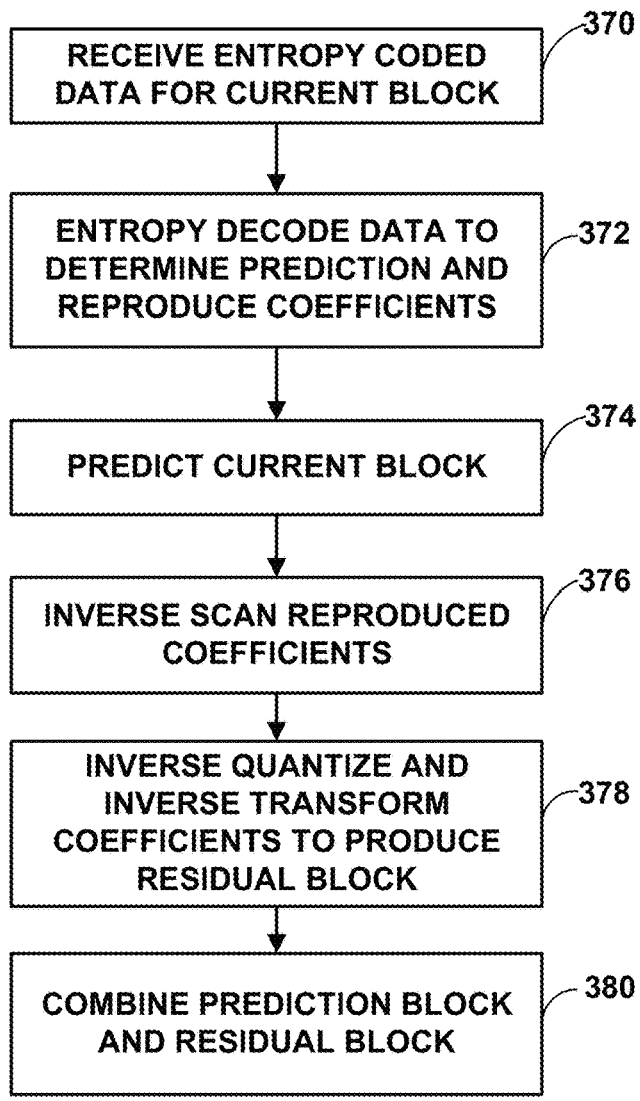
FIG. 24 is a flow diagram illustrating an example of decoding video data according to the techniques of this disclosure.

FIG. 24 is a flowchart illustrating an example method for decoding a current block of video data. The current block may comprise a current CU. Although described with respect to video decoder 300 (FIGS. 1 and 27), it should be understood that other devices may be configured to perform a method similar to that of FIG. 24.

Video decoder 300 may receive entropy coded data for the current block, such as entropy coded prediction information and entropy coded data for coefficients of a residual block corresponding to the current block (370). Video decoder 300 may entropy decode the entropy coded data to determine prediction information for the current block and to reproduce coefficients of the residual block (372). Video decoder 300 may predict the current block (374), e.g., using an intra- or inter-prediction mode as indicated by the prediction information for the current block, to calculate a prediction block for the current block. In some examples, as part of predicting the current block, video decoder 300 may determine whether a SIF index value of a first MV component of a pairwise average MVP is equal to a SIF index value of a second MV component of the pairwise average MVP and if the SIF index value of the first MV component is equal to the SIF index value of the second MV component, set the SIF index of the pairwise average MVP to be equal to the SIF index of the first MV component. In some examples, as part of predicting the current block, video decoder 300 may determine a SIF parameter for a merge list candidate of the video data, perform a merge process and storing the SIF parameter for a MV resulting from the merge process regardless of the SIF parameter being validated for the MV.

Video decoder 300 may then inverse scan the reproduced coefficients (376), to create a block of quantized transform coefficients. Video decoder 300 may then inverse quantize and inverse transform the coefficients to produce a residual block (378). Video decoder 300 may ultimately decode the current block by combining the prediction block and the residual block (380).

This disclosure describes example techniques for switchable interpolation filtering in video coding, including the following examples.

Example 1. A method of coding video data, the method comprising: coding one or more blocks by performing switchable interpolation filtering (SIF) in accordance with any one or combination of the techniques described in this disclosure.

Example 2. The method of example 1, wherein coding comprises decoding.

Example 3. The method of example 1, wherein coding comprises encoding.

Example 4. A device for coding video data, the device comprising: a memory configured to store video data; and a video coder comprising at least one of fixed-function or programmable circuitry, wherein the video coder is configured to perform the method of claim 1.

Example 5. The device of example 4, wherein the video coder comprises a video decoder.

Example 6. The device of example 4, wherein the video coder comprises a video encoder.

Example 7. The device of any of examples 4-6, further comprising a display configured to display decoded video data.

Example 8. The device of any of examples 4-7, wherein the device comprises one or more of a camera, a computer, a mobile device, a broadcast receiver device, or a set-top box.

Example 9. A computer-readable storage medium having stored thereon instructions that, when executed, cause one or more processors to perform the method of any of examples 1-3.

Example 10. A device for coding video data, the device comprising: means for performing the method of any of examples 1-3.

Example 11. A method of coding video data, the method comprising: determining a switchable interpolation filter (SIF) parameter for a merge list candidate of the video data; performing a merge process; storing the SIF parameter for a motion vector (MV) resulting from the merge process regardless of the SIF parameter being validated for the MV; and coding the video data based on the MV.

Example 12. The method of example 11, further comprising: restricting the MV to a half-pel position.

Example 13. The method of example 12, wherein the MV is restricted to the half-pel position by one of clipping the MV to a nearest half-pel position or rounding the MV to the nearest half-pel position.

Example 14. The method of example 11, further comprising altering signaling for a merge motion vector prediction (MMVP) mode or an advanced motion vector prediction (AMVP) mode based on the SIF parameter being stored.

Example 15. The method of example 11, wherein the SIF parameter is inherited by the MV from a history-based MVP.

Example 16. The method of example 15, further comprising utilizing the SIF parameter to manage a history buffer.

Example 17. The method of example 16, wherein the management of the history buffer comprises pruning operations.

Example 18. The method of example 11, the SIF parameter is inherited by the MV from a temporal MVP.

Example 19. The method of example 11, wherein a current block of the video data is a bi-predicted block, the method further comprising: determining a current block size, wherein the SIF parameter is determined based on the current block size.

Example 20. The method of example 19, wherein the determining the SIF parameter comprises setting the SIF parameter to a default value.

Example 21. The method of example 19, wherein the determining the SIF parameter comprises: determining whether a SIF parameter for a first MV component of the bi-predicted block is equal to the SIF parameter for a second MV component of the bi-predicted block; and based on the SIF parameter for the first MV component being equal to the SIF parameter for the second MV component, setting the SIF parameter to be equal to the SIF parameter of the first MV component.

Example 22. The method of example 19, wherein determining the SIF parameter comprises setting the SIF parameter to a first available of the SIF parameter of the first MV component and the SIF parameter of the second MV component.

Example 23. The method of example 19, wherein the SIF parameter of the first MV component points to a first interpolation filter and the SIF parameter of the second MV component points to a second interpolation filter and the determining the SIF parameter comprises setting the SIF parameter to the SIF parameter of the first MV component or to the SIF parameter of the second MV component based on a relative predetermined characteristic.

Example 24. The method of example 23, wherein relative predetermined characteristic is one of a stronger filter or a weaker filter.

Example 25. The method of example 19, wherein determining the SIF parameter comprises setting the SIF parameter to equal a SIF parameter of one of a most often used candidate, a not used candidate or a least used candidate.

Example 26. The method of example 11, further comprising: determining a characteristic for a current block of the video data; based on the characteristic of the current block, constraining the SIF parameter.

Example 27. The method of example 26, wherein the characteristic is one of block size or prediction type.

Example 28. The method of example 26, wherein constraining the SIF parameter comprises setting the SIF parameter to a default value.

Example 29. The method of example 26, wherein constraining the SIF parameter comprises constraining a SIF filter set available for signaling.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data, the method comprising:
   determining whether a switchable interpolation filter (SIF) index value of a first motion vector (MV) component of a first pairwise average motion vector predictor (MVP) is equal to a SIF index value of a second MV component of the first pairwise average MVP;
   based on the SIF index value of the first MV component being equal to the SIF index value of the second MV component, setting a SIF index of the first pairwise average MVP to be equal to the SIF index of the first MV component;
   determining whether a SIF index value of a third MV component of a second pairwise average MVP is equal to a SIF index value of a fourth MV component of the second pairwise average MVP;
   based on the SIF index value of the third MV component not being equal to the SIF index value of the fourth MV component, determining a SIF index value of the second pairwise average MVP, wherein determining the SIF index value of the second pairwise average MVP comprises at least one of i) setting the SIF index value of the second pairwise average MVP to a first available SIF index value between the SIF index value of the third MV component and the SIF index value of the fourth MV component, ii) setting the SIF index value of the second pairwise average MVP to point to a first interpolation filter associated with the third MV component or a second interpolation filter associated with the fourth MV component based on a relative predetermined characteristic, or iii) setting the SIF index value of the second pairwise average MVP to be a SIF index value of an MVP candidate in a merge list based on a criteria; and
   coding the video data based on the SIF index value of the first pairwise average MVP and the SIF index value of the second pairwise average MVP.

2. The method of claim 1, wherein
   determining the SIF index value for the second pairwise average MVP comprises setting the SIF index value of the second pairwise average MVP to the first available SIF index value between the SIF index value of the third MV component and the SIF index value of the fourth MV component.

3. The method of claim 1, wherein the SIF index value of the third MV component points to the first interpolation filter and the SIF index value of the fourth MV component points to the second interpolation filter,
   and wherein determining the SIF index value for the second pairwise average MVP comprises setting the SIF index value of the second pairwise average MVP to point to the first interpolation filter or the second interpolation filter based on the relative predetermined characteristic.

4. The method of claim 3, wherein the relative predetermined characteristic is one of a stronger filter or a weaker filter.

5. The method of claim 1, wherein
   determining the SIF index value for the second pairwise average MVP comprises setting the SIF index value of the second pairwise average MVP to be the SIF index value of the MVP candidate in the merge list based on the criteria.

6. The method of claim 5, wherein the criteria is one of a most often used MVP candidate, a not used MVP candidate, or a least used MVP candidate.

7. A device for coding video data, the device comprising:
   a memory for storing the video data; and
   one or more processors implemented in circuitry and communicatively coupled to the memory, the one or more processors being configured to:
      determine whether a switchable interpolation filter (SIF) index value of a first MV component of a first pairwise average MVP is equal to a SIF index value of a second MV component of the first pairwise average MVP;
      based on the SIF index value of the first MV component being equal to the SIF index value of the second MV component, set a SIF index of the first pairwise average MVP to be equal to the SIF index of the first MV component;
      determine whether a SIF index value of a third MV component of a second pairwise average MVP is equal to a SIF index value of a fourth MV component of the second pairwise average MVP;
      based on the SIF index value of the third MV component not being equal to the SIF index value of the fourth MV component, determine a SIF index value of the second pairwise average MVP, wherein as part of determining the SIF index value of the second pairwise average MVP, the one or more processors are configured to at least one of i) set the SIF index value of the second pairwise average MVP to a first available SIF index value between the SIF index value of the third MV component and the SIF index value of the fourth MV component, ii) set the SIF index value of the second pairwise average MVP to point to a first interpolation filter associated with the third MV component or a second interpolation filter associated with the fourth MV component based on a relative predetermined characteristic, or iii) set the SIF index value of the second pairwise average MVP to be a SIF index value of an MVP candidate in a merge list based on a criteria; and
code the video data based on the SIF index value of the first pairwise average MVP and the SIF index value of the second pairwise average MVP.

8. The device of claim 7, wherein as part of determining the SIF index value of the second pairwise average MVP, the one or more processors are configured to set the SIF index value of the second pairwise average MVP to the first available SIF index value between the SIF index value of the third MV component and the SIF index value of the fourth MV component.

9. The device of claim 7, wherein the SIF index value of the third MV component points to the first interpolation filter and the SIF index value of the fourth MV component points to the second interpolation filter, and wherein
as part of determining the SIF index value of the second pairwise average MVP, the one or more processors are configured to set the SIF index value of the second pairwise average MVP to point to the first interpolation filter or the second interpolation filter based on the relative predetermined characteristic.

10. The device of claim 9, wherein the relative predetermined characteristic is one of a stronger filter or a weaker filter.

11. The device of claim 7, wherein
as part of determining the SIF index value of the second pairwise average MVP, the one or more processors are configured to set the SIF index value of the pairwise average MVP to be the SIF index value of the MVP candidate in the merge list based on the criteria.

12. The device of claim 11, wherein the criteria is one of a most often used MVP candidate, a not used MVP candidate or a least used MVP candidate.

13. The device of claim 7, wherein the device comprises a wireless communication device.

14. A non-transitory computer-readable medium comprising instructions, that when executed, cause one or more processors to:
determine whether a switchable interpolation filter (SIF) index value of a first MV component of a first pairwise average MVP is equal to a SIF index value of a second MV component of the first pairwise average MVP;
based on the SIF index value of the first MV component being equal to the SIF index value of the second MV component, set a SIF index of the first pairwise average MVP to be equal to the SIF index of the first MV component;
determine whether a SIF index value of a third MV component of a second pairwise average MVP is equal to a SIF index value of a fourth MV component of the second pairwise average MVP;
based on the SIF index value of the third MV component not being equal to the SIF index value of the fourth MV component, determine a SIF index value of the second pairwise average MVP, wherein as part of determining the SIF index value of the second pairwise average MVP, the instructions, when executed, cause the one or more processors to at least one of i) set the SIF index value of the second pairwise average MVP to a first available SIF index value between the SIF index value of the third MV component and the SIF index value of the fourth MV component, ii) set the SIF index value of the second pairwise average MVP to point to a first interpolation filter associated with the third MV component or a second interpolation filter associated with the fourth MV component based on a relative predetermined characteristic, or iii) set the SIF index value of the second pairwise average MVP to be a SIF index value of an MVP candidate in a merge list based on a criteria; and
code the video data based on the SIF index value of the first pairwise average MVP and the SIF index value of the second pairwise average MVP.

15. The non-transitory computer-readable medium of claim 14, wherein
as part of determining the SIF index value of the second pairwise average MVP, the instructions cause the one or more processors to set the SIF index value of the second pairwise average MVP to the first available SIF index value between the SIF index value of the third MV component and the SIF index value of the fourth MV component.

16. The non-transitory computer-readable medium of claim 14, wherein the SIF index value of the third MV component points to the first interpolation filter and the SIF index value of the fourth MV component points to the second interpolation filter, and wherein
as part of determining the SIF index value of the second pairwise average MVP, the instructions cause the one or more processors to set the SIF index value of the second pairwise average MVP to point to the first interpolation filter or the second interpolation filter based on the relative predetermined characteristic.

17. The non-transitory computer-readable medium of claim 16, wherein the relative predetermined characteristic is one of a stronger filter or a weaker filter.

18. The non-transitory computer-readable medium of claim 14, wherein
as part of determining the SIF index value of the second pairwise average MVP, the instructions cause the one or more processors to set the SIF index value of the second pairwise average MVP to be the SIF index value of the MVP candidate in the merge list based on the criteria.

19. The non-transitory computer-readable medium of claim 18, wherein the criteria is one of a most often used MVP candidate, a not used MVP candidate or a least used MVP candidate.

* * * * *